US 9,519,379 B2

(12) United States Patent
Ichieda

(10) Patent No.: US 9,519,379 B2
(45) Date of Patent: Dec. 13, 2016

(54) DISPLAY DEVICE, CONTROL METHOD OF DISPLAY DEVICE, AND NON-TRANSITORY COMPUTER-READABLE MEDIUM

(71) Applicant: Seiko Epson Corporation, Tokyo (JP)

(72) Inventor: Hiroyuki Ichieda, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 187 days.

(21) Appl. No.: 13/645,839

(22) Filed: Oct. 5, 2012

(65) Prior Publication Data

US 2013/0106908 A1     May 2, 2013

(30) Foreign Application Priority Data

Nov. 1, 2011 (JP) ................. 2011-240062

(51) Int. Cl.
*G06F 3/042* (2006.01)
*G09G 3/02* (2006.01)

(52) U.S. Cl.
CPC ............... *G06F 3/0425* (2013.01); *G09G 3/02* (2013.01)

(58) Field of Classification Search
CPC ........ G06F 3/0425; G06F 3/02; G06F 3/0481; G06F 3/04883; G06F 3/14
USPC ........................................................ 345/629
See application file for complete search history.

(56) References Cited

U.S. PATENT DOCUMENTS

| | | | |
|---|---|---|---|
| 5,621,430 A * | 4/1997 | Bricklin ................ G06F 3/0481 345/686 |
| 5,717,880 A | 2/1998 | Imai et al. | |
| 5,805,162 A | 9/1998 | Imai et al. | |
| 5,909,213 A * | 6/1999 | Martin .................. G06F 3/0481 715/753 |
| 6,106,399 A * | 8/2000 | Baker ..................... A63F 13/12 463/42 |
| 6,476,823 B1 * | 11/2002 | Gardner ................ G06F 3/0481 345/418 |
| 6,493,008 B1 * | 12/2002 | Yui .......................... G09G 5/08 348/E5.104 |
| 6,934,737 B1 * | 8/2005 | Tang ................... G06F 9/45512 709/204 |
| 7,185,054 B1 * | 2/2007 | Ludwig ................ G06F 3/0482 348/E7.081 |
| 2002/0056577 A1 * | 5/2002 | Kaye ................... G06F 3/04883 178/18.03 |
| 2002/0186212 A1 * | 12/2002 | Matsumoto et al. ......... 345/204 |
| 2002/0186351 A1 * | 12/2002 | Gnanamgari ......... G06F 3/0386 353/42 |

(Continued)

FOREIGN PATENT DOCUMENTS

| JP | H07-084561 | 3/1995 |
|---|---|---|
| JP | 2005-092447 A | 4/2005 |

(Continued)

*Primary Examiner* — Gregory J Tryder
*Assistant Examiner* — Jitesh Patel
(74) *Attorney, Agent, or Firm* — ALG Intellectual Property, LLC

(57) ABSTRACT

A projector provides plural display areas on a screen and respectively displays input images input from plural image sources in the respective display areas by a projection unit, and includes a location detection unit that detects a pointed location of a pointing tool on the screen, and an image processing unit that executes processing over the plural display areas according to the detected pointed location.

6 Claims, 16 Drawing Sheets

(56) References Cited

U.S. PATENT DOCUMENTS

| | | | |
|---|---|---|---|
| 2003/0203347 A1* | 10/2003 | Notomi | G09B 5/00 434/350 |
| 2003/0210229 A1* | 11/2003 | Nishimura et al. | 345/157 |
| 2004/0070674 A1* | 4/2004 | Foote | H04N 7/18 348/207.99 |
| 2005/0060658 A1 | 3/2005 | Tsukiori | |
| 2005/0117121 A1* | 6/2005 | Meerleer | 353/30 |
| 2006/0085767 A1* | 4/2006 | Hinckley et al. | 715/863 |
| 2006/0197756 A1* | 9/2006 | Sun | G06F 3/042 345/179 |
| 2006/0230156 A1* | 10/2006 | Shappir | G06F 3/1454 709/227 |
| 2006/0271521 A1* | 11/2006 | Denoue et al. | 707/3 |
| 2007/0124370 A1* | 5/2007 | Nareddy | G06Q 10/10 709/204 |
| 2008/0222233 A1* | 9/2008 | Shi | G06F 17/30017 709/201 |
| 2008/0259184 A1* | 10/2008 | Shingu | G06K 9/22 348/231.99 |
| 2008/0284733 A1* | 11/2008 | Hill | G06F 3/0428 345/163 |
| 2008/0297482 A1* | 12/2008 | Weiss | 345/173 |
| 2009/0021480 A1* | 1/2009 | Tagawa | G03B 21/14 345/158 |
| 2009/0137269 A1* | 5/2009 | Chung | G06F 3/0317 455/556.1 |
| 2009/0265670 A1* | 10/2009 | Kim et al. | 715/863 |
| 2009/0300510 A1* | 12/2009 | Gantman | G06F 3/0481 715/740 |
| 2009/0303263 A1* | 12/2009 | Minobe | 345/690 |
| 2009/0325142 A1* | 12/2009 | Beavers | G09B 5/14 434/365 |
| 2010/0079369 A1* | 4/2010 | Hartmann | G06F 3/0416 345/156 |
| 2010/0188478 A1* | 7/2010 | Robinson | H04N 7/15 348/14.16 |
| 2010/0245563 A1* | 9/2010 | Golovchinsky | H04N 7/18 348/135 |
| 2010/0289906 A1* | 11/2010 | Kaye | G09B 7/00 348/207.11 |
| 2010/0309210 A1* | 12/2010 | Akaiwa | G03B 21/14 345/536 |
| 2011/0239133 A1* | 9/2011 | Duffus | G06F 9/461 715/753 |
| 2011/0310066 A1* | 12/2011 | Fermgard | B43K 8/00 345/179 |
| 2012/0110470 A1* | 5/2012 | Mistry et al. | 715/748 |
| 2012/0326978 A1* | 12/2012 | Tokita | G06F 3/0488 345/157 |

FOREIGN PATENT DOCUMENTS

| | | |
|---|---|---|
| JP | 2008-3802 A | 1/2008 |
| JP | 4272904 B | 6/2009 |

* cited by examiner

DISPLAY DEVICE, CONTROL METHOD OF DISPLAY DEVICE, AND NON-TRANSITORY COMPUTER-READABLE MEDIUM

BACKGROUND

1. Technical Field

The present invention relates to a display device that displays an image on a display surface, a control method of the display device, and a program.

2. Related Art

In related art, when a specific location of an image displayed by a display device such as a projector is pointed, a device of detecting the pointed location and displaying a pointer or the like in response to the detected location has been known (for example, see Patent Document 1 (Japanese Patent No. 4272904)). In this type of device, when the pointed location is detected, for example, the pointer is displayed in response to the pointed location, and an image showing the trace of the pointed location is drawn and displayed. Generally, equipment such as a personal computer that supplies images to the display device executes processing of displaying a pointer and drawing its trace according to a pointed location, and the display device in related art outputs information indicating the pointed location to a device that supplies images.

A display device in related art having a function of displaying plural images at the same time in one display window or display area has been known. Plural devices are connected to the type of display device, and the respective images displayed at the same time are individually controlled by the respective devices. Accordingly, if the operation in response to the pointed location is attempted in the above described manner, the images individually controlled by the respective devices can not be integrally changed.

SUMMARY

An advantage of some aspects of the invention is to enable processing, during display of plural images, on the plural images being displayed according to a pointed location with respect to a display surface.

An aspect of the invention is directed to a display device including a display unit that provides plural display areas on a display surface and respectively displays input images input from plural image sources in the respective display areas, a location detection unit that detects a pointed location on the display surface, and a processing unit that executes processing over the plural display areas according to the pointed location detected by the location detection unit.

According to the aspect of the invention, the processing over the plural display areas may be executed and the input images from the plural image sources may be processed in response to the location pointing operation for the display surface.

Another aspect of the invention is directed to the display device described above, wherein the processing unit draws an image over the plural display areas and superimposes and displays the drawn image on the input images by the display unit according to the pointed location detected by the location detection unit.

According to the aspect of the invention, the image may be drawn, superimposed, and displayed over the plural images input from the plural image sources in response to the location pointing operation for the display surface.

Still another aspect of the invention is directed to the display device described above, the processing unit executes processing of enlarged or reduced display of the images being displayed in the plural display areas within the respective display areas according to the pointed location detected by the location detection unit.

According to the aspect of the invention, the plural images input from the plural image sources may be collectively enlarged or reduced and displayed in response to the operation of location pointing for the display surface.

Yet another aspect of the invention is directed to a control method of controlling a display device that displays an input image input from an image source on a display surface, including providing plural display areas on the display surface and respectively displaying input images input from plural image sources in the respective display areas, detecting a pointed location on the display surface, and executing processing over the plural display areas according to the detected pointed location.

By executing the control method according to the aspect of the invention, the processing over the plural display areas may be executed and the input images input from plural image sources may be processed in response to the location pointing operation for the display surface.

Still yet another aspect of the invention is directed to a computer-executable program that controls a display device that displays an input image input from an image source on a display surface, allowing the computer to function as a display unit that provides plural display areas on the display surface and respectively displaying input images input from plural image sources in the respective areas, a location detection unit that detects a pointed location on the display surface, and a processing unit that executes processing over the plural display areas according to the pointed location detected by the location detection unit.

By executing the program according to the aspect of the invention, the computer controlling the display device may execute the processing over the plural display areas and may process the input images input from plural image sources in response to the location pointing operation for the display surface.

The program may be implemented as a recording medium in which the program is recorded in a computer-readable form.

According to the aspects of the invention, the processing over the plural display areas may be executed and the input images input from the plural image sources may be processed in response to the location pointing operation for the display surface.

BRIEF DESCRIPTION OF THE DRAWINGS

The invention will be described with reference to the accompanying drawings, wherein like numbers reference like elements.

FIG. 4A shows a state in which a pointer is projected according to a pointed location and FIG. 4B shows an example in which drawing is performed according to the pointed location.

FIG. 13A shows a state before operation in normal display, FIG. 13B shows an example of a trace of a pointed location, FIG. 13C shows a state before operation in multi-window display, and FIG. 13D shows an example of a trace of a pointed location in the multi-window display.

FIG. 14A shows a state in which a center of zoom is pointed and FIG. 14B shows a state in which zoom processing has been performed according to the pointed center.

DESCRIPTION OF EXEMPLARY EMBODIMENTS

As below, embodiments to which the invention is applied will be explained with reference to the drawings.

Figure 1:
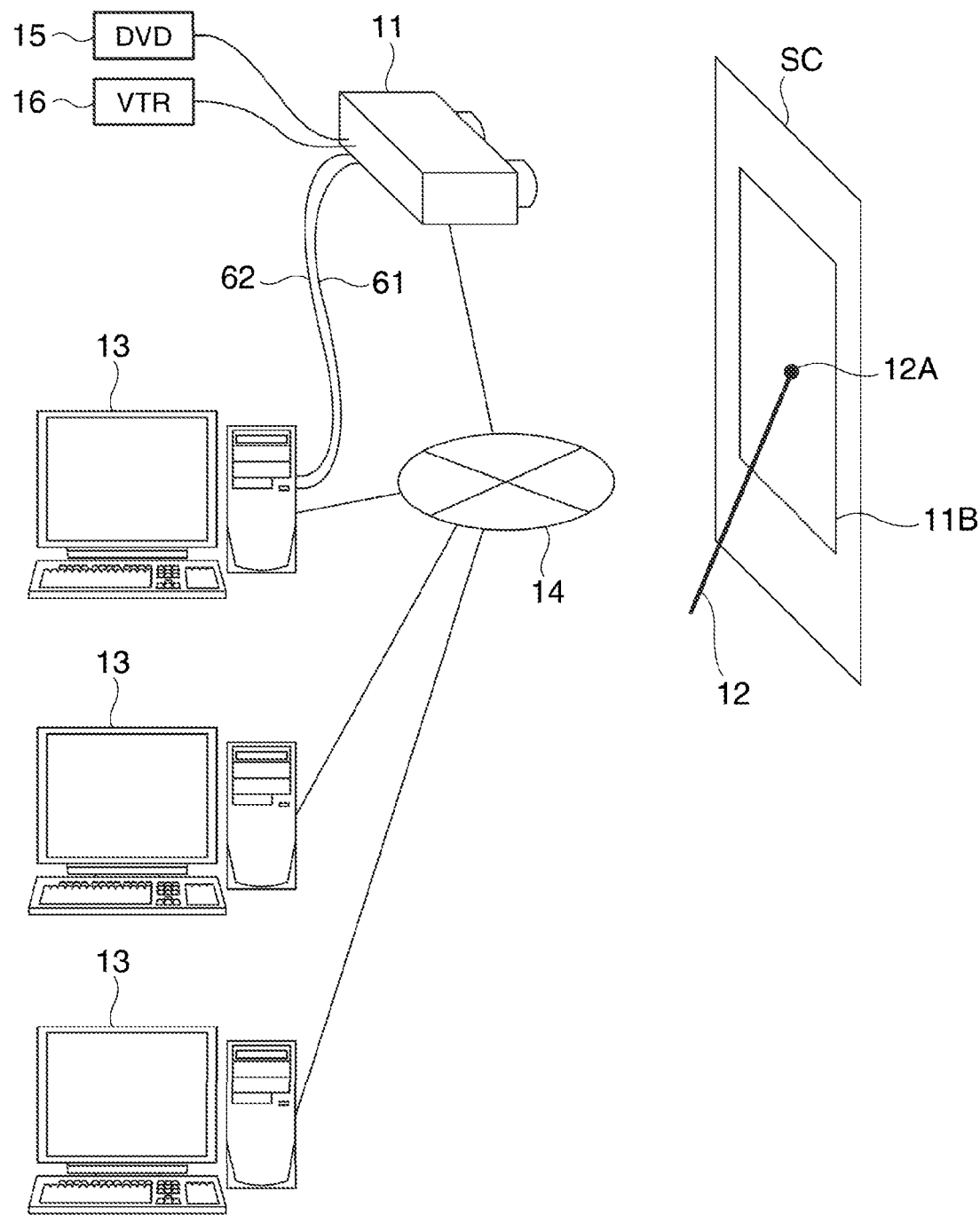
FIG. 1 shows a configuration of a display system according to an embodiment of the invention.

FIG. 1 shows a configuration of a display system 10 using a projector 11 according to an embodiment.

The projector 11 as a display device is wired-connected to a PC (Personal Computer) 13, a DVD player 15, and a video recorder 16 as image supply devices. A plurality of the PCs 13 are connected to the projector 11 via a network 14, and image data may be supplied to the projector 11 from any one of the PCs 13. The network 14 includes a wired communication line such as a LAN cable or a wireless communication line, the network 14 and the projector 11 are wired- or wireless-connected and various data can be transmitted and received between the projector 11 and the respective PCs 13 and between the PCs 13 via the network 14.

In the configuration exemplified in FIG. 1, the projector 11 is connected to one PC 13 by an RGB cable 61 for transmitting analog video signals and a USB cable 62 for transmitting digital data. The PC 13 may output the analog video signals to the projector 11 via the RGB cable 61. Further, the projector 11 transmits and receives various control data etc. including coordinate data (coordinate information), which will be described later, between the PC 13 and itself via the USB cable 62. Note that, obviously, a configuration in which the PC 13 and the projector 11 are connected via a DVI cable or the like and digital image data is transmitted may be employed.

The projector 11 performs projection on a screen SC as a projection surface (display surface) based on image data input from the PC 13, the DVD player 15, and the video recorder 16. The projector 11 may perform projection if the image data input from the PC 13, the DVD player 15, and the video recorder 16 represents a still image or a moving image. The screen SC is not limited to a flat plate fixed to a wall surface, but the wall surface itself may be used as the screen SC. Here, a range in which images are projected on the screen SC is referred to as an effective projection area 11B (displayable area). Further, the projector 11 is connected to the PC 13 by a communication cable or the like and transmits and receives control data etc. between the PC 13 and itself.

In the display system 10, during image projection by the projector 11, a user may hold a pointing tool 12 in his or her hand and execute an operation of pointing an arbitrary location (hereinafter, referred to as "location pointing operation") in the effective projection area 11B of the screen SC. The pointing tool 12 is an operation device having a pen shape or a rod shape, and used for pointing an arbitrary location on the screen SC. The projector 11 has a function of detecting a tip end location of the pointing tool 12, as will be described later, and outputs coordinate data indicating coordinates of the detected pointed location to the PC 13. Further, the projector 11 performs processing of drawing an image along the pointed locations or the like on the coordinates of the detected locations. The pointing tool 12 may include operation tools such as buttons. When the pointing tool 12 includes the operation tools, the projector 11 may detect information indicating that the operation tool has been operated (e.g., the operation tool has been pressed), information indicating that the operation for the operation tool has been terminated (e.g., the state in which the operation tool is pressed has been changed to the state in which the operation tool is not pressed), etc. In this case, the information may be transmitted as control data from the projector 11 to the PC 13 in addition to the coordinate data.

Figure 2:
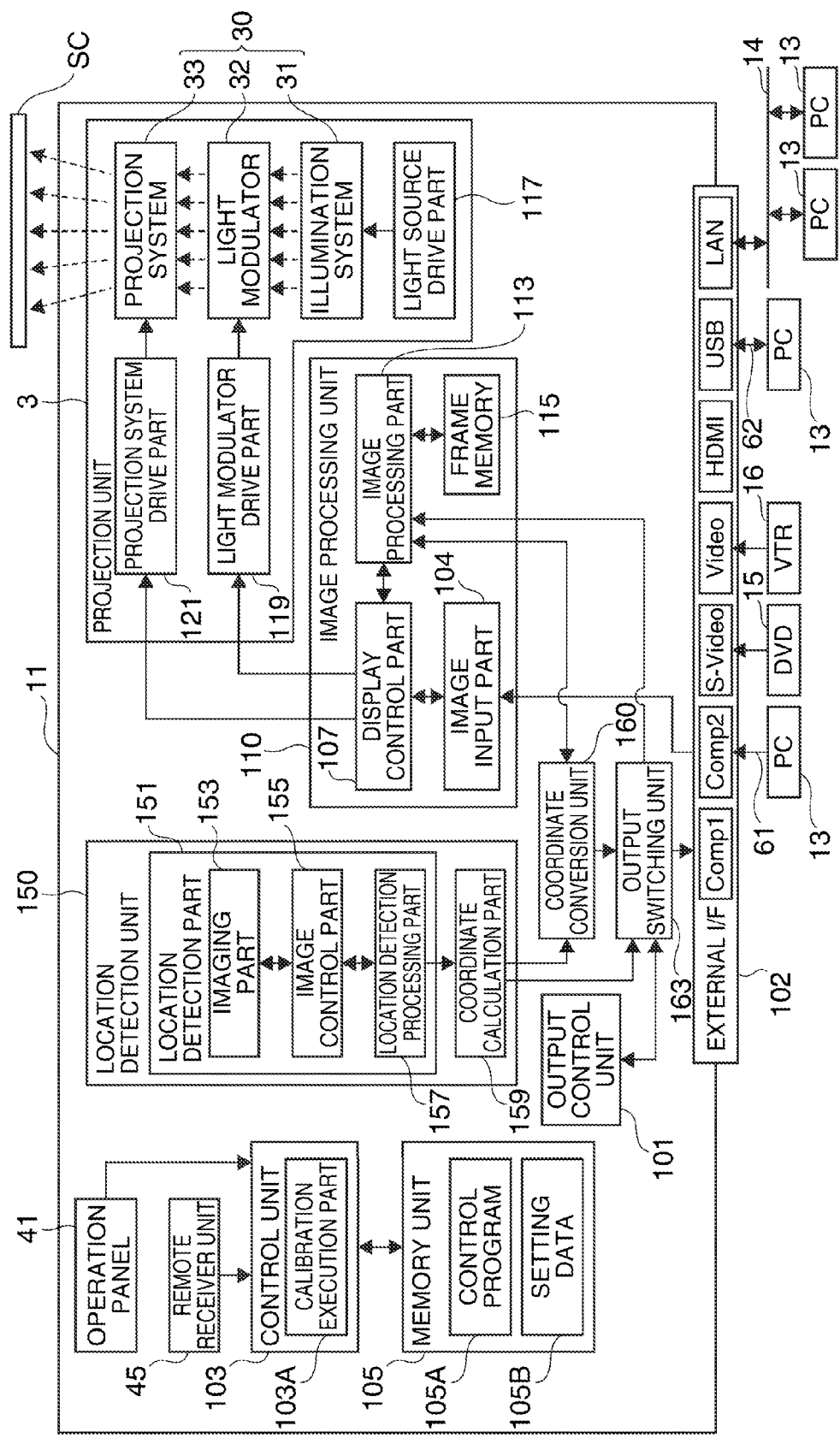
FIG. 2 is a block diagram showing a functional configuration of a projector.

FIG. 2 is a block diagram showing a functional configuration of the projector 11.

The projector 11 is roughly divided and includes an image processing unit 110 that executes image processing for display based on an input image input from the PC 13 via the RGB cable 61 or the network 14 or an input image input from the DVD player 15, the video recorder 16, or the like, a projection unit 3 (display unit) that projects an image on the screen SC according to the control of the image processing unit 110, a location detection unit 150 that detects a pointed location of the pointing tool 12 on the screen SC, a coordinate conversion part 160 that converts coordinates of the pointed location detected by the location detection unit 150 into coordinates in the image data, an output switching unit 163 that outputs the converted coordinates converted by the coordinate conversion part 160 to the PC 13 or the image processing unit 110, an output control unit 101 that switches an output destination of the coordinates to be output by the output switching unit 163, and a control unit 103 that controls the respective units.

The control unit 103 includes a CPU, a nonvolatile memory, a RAM, etc. (not shown), and reads out a control program 105A stored in a memory unit 105 connected to the control unit 103 and controls the respective units of the projector 11. Further, by executing the control program 105A stored in the memory unit 105, the control unit 103 functions as a calibration execution part 103A. The calibration execution part 103A executes calibration, which will be described later, and obtains a correspondence relationship (coordinate conversion parameter) between the coordinates in taken image data and the coordinates in the area on the screen SC to be calibrated. The memory unit 105 includes a magnetic, optical recording device or a semiconductor memory device, and stores data of various programs, various set values, etc. including the control program 105A.

An operation panel 41 and a remote receiver unit 45 are connected to the control unit 103.

The operation panel 41 includes various switches and indicator lamps and is provided on an exterior housing (not shown) of the projector 11. The control unit 103 appropriately lights or blinks the indicator lamps of the operation panel 41 in response to the operation condition and the set condition of the projector 11. When the switch of the operation panel 41 is operated, an operation signal in response to the operated switch is output to the control unit 103. The operation panel 41, the remote, etc. form an operation part for the user to input the operation for the projector 11. Note that the operation signal indicating the operation for the projector 11 may be transmitted from the PC 13 to the projector 11 and the projector 11 may be controlled based on the operation signal. When the operation signal is transmitted from the PC 13, for example, the operation signal may be transmitted to the projector 11 via a USB interface or the like. In this case, the PC 13 also function as the operation part for the user to input the operation for the projector 11.

Further, the projector 11 receives an infrared signal transmitted from a remote (not shown) used by the user as an operator who operates the projector 11 in response to a button operation of the user by the remote receiver unit 45. The remote receiver unit 45 receives the infrared signal received from the remote using a light receiving element, and outputs an operation signal in response to the signal to the control unit 103.

The control unit 103 detects the operation by the user based on the operation signal input from the operation panel 41 or the remote receiver unit 45, and controls the projector 11 according to the operation.

The projector 11 includes an external I/F 102 connected to the PC 13, the network 14, the DVD player 15, and the video recorder 16, etc. The external I/F 102 is an interface for transmitting and receiving various data such as control data and digital image data and analog video signals, and includes plural kinds of connectors and interface circuits compliant to these connectors. In the embodiment, the external I/F 102 has a Comp interface connected to a video output terminal of a computer, an S-Video interface connected to a video reproducer or a DVD reproducer, a Video interface, an HDMI interface compliant to the HDMI (registered trademark) standard to which a digital appliance or the like is connected, a USB interface connected to a USB terminal of a computer, and a LAN interface connected to a LAN including a computer.

The Comp interface is a VGA terminal to which an analog video signals are input from the computer, a DVI (Digital Visual Interface) to which digital video signals are input, or the like. The RGB cable 61 (FIG. 1) is connected to the Comp interface and the USB cable 62 (FIG. 1) is connected to the USB interface.

The S-video interface has an S-video terminal to which composite video signals such as NTSC, PAL, or SECAM are input from an image supply device such as a video reproducer, a DVD reproducer, a television tuner, a set top box of CATV, or a video game machine. In the embodiment, the DVD player 15 is connected to the S-Video interface.

The Video interface has an RCA terminal to which composite video signals are input from the image supply device, a D-terminal to which a component video signals are input, or the like, and analog image signals are input thereto. In the embodiment, the video recorder 16 is connected to the Video interface.

The USB interface has a USB terminal (not shown) and a USB controller (not shown) that transmits and receives control data and digital image data between the computer and itself via the USB terminal. Here, the external I/F 102 may have a USB-B interface for connection to a device of the PC 13 or the like as a USB host device, or may have a USB-A interface for connection to a device such as a USB memory or a document camera that functions as a USB slave device for the projector 11. Further, the interface may have both interfaces of USB-A and USB-B.

Further, the LAN interface has a terminal such as an RJ-45 terminal connectable to a LAN cable, and is connected to a LAN including one or more computers via the terminal. For example, the LAN interface has a network interface circuit (not shown) compliant to the Ethernet (registered trademark) standard, and transmits and receives control data and image data between the computer forming the LAN and itself.

Furthermore, the external I/F 102 may have a DisplayPort designed by VESA (Video Electronics Standards Association), and specifically have a DisplayPort connector or a Mini Displayport connector and an interface circuit compliant to the Displayport standard. In this case, the projector 11 is connected to the PC 13 or a DisplayPort of a portable device having the equal function to that of the PC 13 and digital image data can be input thereto.

In addition, the external I/F 102 may transmit and receive image signals via wired communication or may transmit and receive image signals via wireless communication. For example, the external I/F 102 may have a wireless communication interface such as a wireless LAN and the projector 11 may connect to various devices such as the PC 13 via a wireless communication line.

The respective devices (the above described image supply devices) connected to the respective interfaces of the external I/F 102 are referred to as "image sources" and image signals or image data input from the respective image sources are collectively referred to as "input images". Accordingly, the input images include both analog image signals and digital image data.

The projector 11 is roughly divided and includes an optical system that forms an optical image and an image processing system that electrically processes an image signal. The optical system has a projection part 30 including an illumination system 31, a light modulator 32, and a projection system 33. The illumination system 31 includes a light source of a xenon lamp, a ultrahigh pressure mercury lamp, an LED (Light Emitting Diode), a laser, or the like. Further, the illumination system 31 may include a reflector and an auxiliary reflector that guide light generated by the light source to the light modulator 32, and may include a group of lenses (not shown) for improving the optical property of the projection light, a polarizer, a photochromic element that reduces the amount of light generated by the light source in a path reaching the light modulator 32, or the like.

The light modulator 32 receives the signal from the image processing system, which will be described later, and modulates the light from the illumination system 31. In the embodiment, the case where the light modulator 32 is formed using a transmissive liquid crystal panel will be explained as an example. In this configuration, the light modulator 32 includes three liquid crystal panels corresponding to the three primary colors of RGB for color projection. The light from the illumination system 31 is separated into three color lights of RGB and the respective color lights enter the corresponding respective liquid crystal panels. The color lights modulated through the respective liquid crystal panels are combined by a combining system including a cross dichroic prism or the like and output to the projection system 33.

The projection system 33 includes a zoom lens that enlarges, reduces, and focuses the projected image, a zoom adjustment motor that adjusts the degree of zooming, a focus adjustment motor that performs adjustment of focus, etc.

The projection unit 3 (display unit) includes a projection system drive part 121 that drives the respective motors of the projection system 33 according to the control of a display control part 107, a light modulator drive part 119 that drives the light modulator 32 for drawing based on the image signal output from the display control part 107, and a light source drive part 117 that drives the light source of the illumination system 31 according to the control of the control unit 103 in addition to the projection part 30.

On the other hand, the image processing system includes an image processing unit 110 that processes image data according to the control of the control unit 103 that controls the entire projector 11 in an integrated manner. The image processing unit 110 includes an image input part 104 that processes an input image input from the external I/F 102. For example, the image input part 104 has an A/D converter circuit that converts analog video signals into digital image data, and converts the analog video signals input via the analog video terminal of the external I/F 102 into image data and outputs them to an image processing part 113. Further, the image input part 104 has a function of discriminating a port to which the input video has been input in the external I/F 102.

Furthermore, the image processing unit 110 includes the display control part 107 that allows an image processing part 113 to execute processing for selecting at least one input image of the input images input from the external I/F 102 via the image input part 104 according to the control of the control unit 103 and displaying images based on the image data as the selected input images, and the image processing part 113 that processes the input images and develops the images projected by the projection part 30 in the frame memory 115 according to the control of the display control part 107. The image processing unit 110 functions as a processing unit.

The control unit 103 reads out and executes a control program 105A stored in a memory unit 105, and thereby, controls the respective units of the projector 11.

The display control part 107 performs discrimination of the format (frame rate, resolution, compression state) of the image data input via the image input part 104 or the like, determines necessary processing for displaying a display image on the light modulator 32, and executes the processing by controlling the image processing part 113. The image processing part 113 develops the image data input via the image input part 104 in the frame memory 115 according to the control of the display control part 107, appropriately executes various conversion processing such as interlace/progressive conversion and resolution conversion, generates an image signal in a predetermined format for displaying the display image drawn in the frame memory 115, and outputs the signal to the display control part 107. Note that the projector 11 may change the resolution and the aspect ratio of the input image data and display the data, or display the image data dot by dot with the resolution and the aspect ratio of the input image data maintained. Further, the image processing part 113 may execute various image processing such as keystone correction, color compensation in response to the color mode, and enlarging/reducing processing according to the control of the display control part 107. The display control part 107 outputs the image signal processed by the image processing part 113 to the light modulator drive part 119, and displays the signal on the light modulator 32. Further, the image processing part 113 derives image location information, which will be described later, from information of the resolution, the aspect ratio of the image data being displayed, the display size in the liquid crystal display panel of the light modulator 32, etc., and outputs the obtained image location information to the coordinate conversion part 160.

The control unit 103 executes the control program 105A and controls the display control part 107 to execute the keystone correction of the display image formed on the screen SC. Further, the control unit 103 controls the display control part 107 to execute the enlarging/reducing processing of the display image based on the operation signal input from the operation panel 41 or the remote receiver unit 45.

When an analog image signal is input from equipment connected to the external I/F 102 to the image input part 104, the signal is converted into digital image data by the image input part 104, and then, processed as the digital image data. Further, when digital image data is input from equipment connected to the external I/F 102 to the image input part 104, the image input part 104 outputs the digital image data as it is to the image processing part 113. In this manner, regardless whether the input image is analog or digital, the image processing unit 110 performs processing as digital image data. In the following explanation, the process of A/D conversion of the analog image signal will be omitted and the image processing unit 110 processes image data.

The control unit 103 selects one or more image sources from the respective image sources connected to the external I/F 102 and inputs input images of the image sources to the image input part 104. Further, the control unit 103 has a function of discriminating the image sources inputting from the external I/F 102 to the image input part 104.

Here, the control unit 103 may perform selection and discrimination with respect to each type of interface connected to the respective image sources in the external I/F 102, may perform selection and discrimination with respect to each type of input image input from the image sources, or may perform selection and discrimination with respect to each connector. Furthermore, the unit may select and discriminate the image sources by identifying the type itself of each device connected to the external I/F 102. For example, the equipment connected to the HDMI interface or the LAN interface transmits and receives the control data between the projector 11 and itself, and the types of the respective equipment (devices) may be discriminated based on the control data. Specifically, the devices as the image sources are specifically identified and classified into the PC 13, the DVD recorder, the USB memory, the PDA (Personal Digital Assistant), the cellular phone, a media player having a semiconductor memory, or the like, and the types of the image sources may be discriminated by the classification.

Further, in the case where image data is stored in the memory unit 105, when reproduction display of the image data stored in the memory unit 105 is commanded by the operation detected by the operation panel 41 or the remote receiver unit 45, the control unit 103 may select the projector 11 itself as the image source.

Furthermore, the projector 11 has the so-called multi-window display function of simultaneously arranging and displaying plural input images side by side on the screen SC as will be described later. By the operation detected by the operation panel 41 or the remote receiver unit 45 or the previous setting, the control unit 103 performs multi-window display of dividing an area in which images can be displayed (the projectable area 11A or the effective projection area 11B) into plural areas and displaying the plural input images input from the plural image sources (image supply devices) side by side. In the case of the multi-window display, the control unit 103 selects the image sources of the plural image sources connected to the external I/F 102 in the number within the upper limit that can be simultaneously displayed in multi-window display.

The projector 11 has the location detection unit 150 (position detection unit) that detects coordinates of the pointed location pointed by the pointing tool 12 on the screen SC. Further, the location detection unit 150 obtains the coordinates of the detected pointed location in the area on the screen SC to be calibrated (e.g., the effective projection area 11B). The location detection unit 150 includes a location detection part 151 having an imaging part 153 that images the screen SC, an image control part 155 that controls the imaging part 153, and a location detection processing part 157 that detects the pointed location of the pointing tool 12 based on the taken image of the imaging part 153, and a coordinate calculation part 159 that calculates the coordinates of the pointed location detected by the location detection part 151.

The imaging part 153 is a digital camera of taking an angle of view including the maximum range in which the projection part 30 can project images on the screen SC (corresponding to a projectable area 11A, which will be described later), and executes imaging according to the control of the image control part 155 and outputs taken image data. In other words, the imaging part 153 is set to be able to image the range containing the whole projectable area 11A. The image control part 155 controls the imaging part 153 to execute imaging according to the control of the control unit 103. When the imaging part 153 has mechanisms of adjusting zoom factor, focus, aperture at imaging, the image control part 155 controls these mechanisms to execute imaging under preset conditions. After imaging, the image control part 155 acquires the taken image data output by the imaging part 153 and outputs the data to the location detection processing part 157. The taken image data output from the imaging part 153 may be expressed in the format of RGB, YUV, or the like, or may indicate only the brightness component. Further, the image control part 155 may output the taken image data output from the imaging part 153 to the location detection processing part 157 without change, or adjust resolution or convert the data into a predetermined file format (JPEG, BMP, or the like) and output the data to the location detection processing part 157.

Note that the imaging part 153 may have a configuration that can image visible light or a configuration that can image non-visible light (infrared light or the like). In the case where the imaging part 153 can image non-visible light, a configuration in which the pointing tool 12 outputs non-visible light and the imaging part 153 images the non-visible light output from the pointing tool 12 or a configuration in which the pointing tool 12 has a reflection part that can reflect non-visible light, non-visible light is projected from the projector 11 to the screen SC under the control of the control unit 103, and the non-visible light reflected by the reflection part of the pointing tool 12 is imaged by the imaging part 153, or the like may be employed. Further, a pattern for location detection may be provided on the surface of the pointing tool 12. In this case, by detecting the pattern for location detection from the taken image taken by the imaging part 153, the pointing tool 12 may be detected.

The location detection processing part 157 analyzes the taken image data input from the image control part 155, and extracts a boundary between the outside of the effective projection area 11B and the effective projection area 11B and the image of the pointing tool 12 from the taken image data and specifies the pointed location by the pointing tool 12. The pointed location of the pointing tool 12 is a location of the tip end of the rod-shaped or pen-shaped pointing tool 12, for example. The coordinate calculation part 159 converts the coordinates according to the pointed location of the pointing tool 12 detected by the location detection processing part 157 and a coordinate conversion parameter, which will be described later, obtained by the calibration execution part 103A, and obtains the coordinate data (first coordinate information) indicating the coordinates of the pointed location (first coordinates) in the area on the screen SC to be calibrated (in the embodiment, the effective projection area 11B).

Further, the projector 11 includes the coordinate conversion part 160 that converts the coordinate data indicating the coordinates (first coordinates) output by the location detection unit 150 into the coordinate data (second coordinate information) indicating the coordinates (second coordinates) in the image data input from the PC 13.

The coordinates output by the location detection unit 150 are coordinates detected based on the taken image data of the imaging part 153, and coordinates on coordinate system virtually provided on the display image formed on the screen SC. The coordinate conversion part 160 acquires various information including resolution of the image developed by the image processing part 113 in the frame memory 115 and information on processing of resolution conversion, zooming, or the like performed when the image processing part 113 developed the image, and converts the coordinates on the display image obtained by the location detection unit 150 into coordinates in the input image data based on the acquired information. As described above, the light modulator 32 is formed using the liquid crystal panel having a predetermined number of pixels arranged laterally and longitudinally in a matrix, for example, and, by placing the coordinate axes of the virtual orthogonal coordinate system in the arrangement directions of the pixels, the location on the panel may be expressed by the coordinates. On the other hand, the coordinates in the taken image data are affected by various elements such as the distance between an imaging device 5 and the screen SC. Accordingly, in the projector 11 according to the embodiment of the invention, calibration, which will be described later, is first executed, and a correspondence relationship (coordinate conversion parameter) between the coordinates in the taken image data and the coordinates in the area on the screen SC to be calibrated is obtained. Here, the area on the screen SC to be calibrated may be the entire effective projection area 11B or a part of the effective projection area 11B. As the case where the part of the effective projection area 11B is calibrated, the case where, when the aspect ratio of the display image of the projector 11 and the aspect ratio of the screen SC are different (for example, the display resolution of the projector 11 is WXGA and the aspect ratio of the screen SC is 4:3), display is performed so that the width in the vertical direction of the display image of the projector 11 may be the same as the width in the vertical direction of the screen SC is considered. In this case, it is conceivable that, of the effective projection area 11B of the projector 11, the area contained in the screen SC is to be calibrated and the other areas are not to be calibrated. When the coordinate conversion parameter is obtained by the calibration execution part 103A, the coordinate calculation part 159 performs conversion of the coordinates based on the coordinate conversion parameter. The conversion processing will be described later. Further, the coordinate conversion part 160 converts the coordinates output from the coordinate calculation part 159 (first coordinates) based on the image location information, which will be described later, and outputs the converted coordinates (second coordinates) to the output switching unit 163.

The output switching unit 163 has a function of selectively switching the output destination to which the converted coordinates converted by the coordinate conversion part 160 are output and, in the embodiment, selects either the external I/F 102 or the image processing unit 110 as the output destination and outputs the coordinates. The output switching unit 163 switches the output destination to which the converted coordinates are output according to the control of the output control unit 101 and outputs the coordinates.

The display control part 107 draws the image of the pointer 12A in response to the pointed location of the pointing tool 12 on the image developed in the frame memory 115 according to the coordinates input from the output switching unit 163.

Here, the coordinate calculation part 159 can output the coordinates (first coordinates) to the output switching unit 163 not via the coordinate conversion part 160. Accordingly, the output switching unit 163 may output the coordinates (first coordinates) output by the coordinate calculation part 159 to the PC 13 via the external I/F 102 or the image processing part 113. Further, if the coordinate conversion part 160 has a function of, not converting the coordinates (first coordinates) input from the coordinate calculation part 159, but outputting the coordinates to the output switching unit 163, the same advantage as that when the coordinate calculation part 159 directly outputs the coordinates to the output switching unit 163 may be obtained.

Note that, in the embodiment, conversion is performed by the coordinate conversion part 160 when the coordinates are output to the PC 13, and conversion is not performed by the coordinate conversion part 160 when the coordinates are output to the image processing part 113, however, the configuration of the projector 11 is not limited to that. The coordinate conversion part 160 may perform conversion of the coordinates when the coordinate information is output to the PC 13 or the image processing part 113.

Further, the projector 11 may not include the coordinate conversion part 160. In this case, the first coordinates output by the coordinate calculation part 159 are output to the PC 13 and the image processing part 113.

The coordinates output to the external I/F 102 by the output switching unit 163 are input to the PC 13 via the USB interface of the external I/F 102, for example. The coordinate data output by the output switching unit 163 is output to the PC 13 as the same data as coordinate data output by a pointing device such as a mouse, a trackball, a digitizer, a pen tablet, or the like. When the pointing tool 12 includes the operation tools, in addition to the coordinate data, information indicating that the operation tool has been operated and information indicating that the operation for the operation tool has been terminated may be output to the PC 13.

Here, in the PC 13, in the case where the coordinate data output from the output switching unit 163 is treated equally to the coordinate data output by the general-purpose pointing devices, general-purpose device driver programs corresponding to these general-purpose pointing devices may be used. Generally, these general-purpose device driver programs are installed as part of the OS (operating system) of the PC 13 in advance, and thus, it is not necessary to install device driver programs when the general-purpose device driver programs are used. Further, it is not necessary to prepare specialized device driver programs because the general-purpose device driver programs are used. On the other hand, the information that can be exchanged between the projector 11 and the PC 13 is limited in the range defined by the specifications of the general-purpose device driver programs.

Alternatively, specialized device driver programs compliant to the projector 11 may be prepared and the device driver programs may be installed and used in the PC 13. In this case, the specialized device driver programs are necessary, but the information that can be exchanged between the projector 11 and the PC 13 may be arbitrarily set in response to the specifications of the specialized device driver programs.

Figure 3:
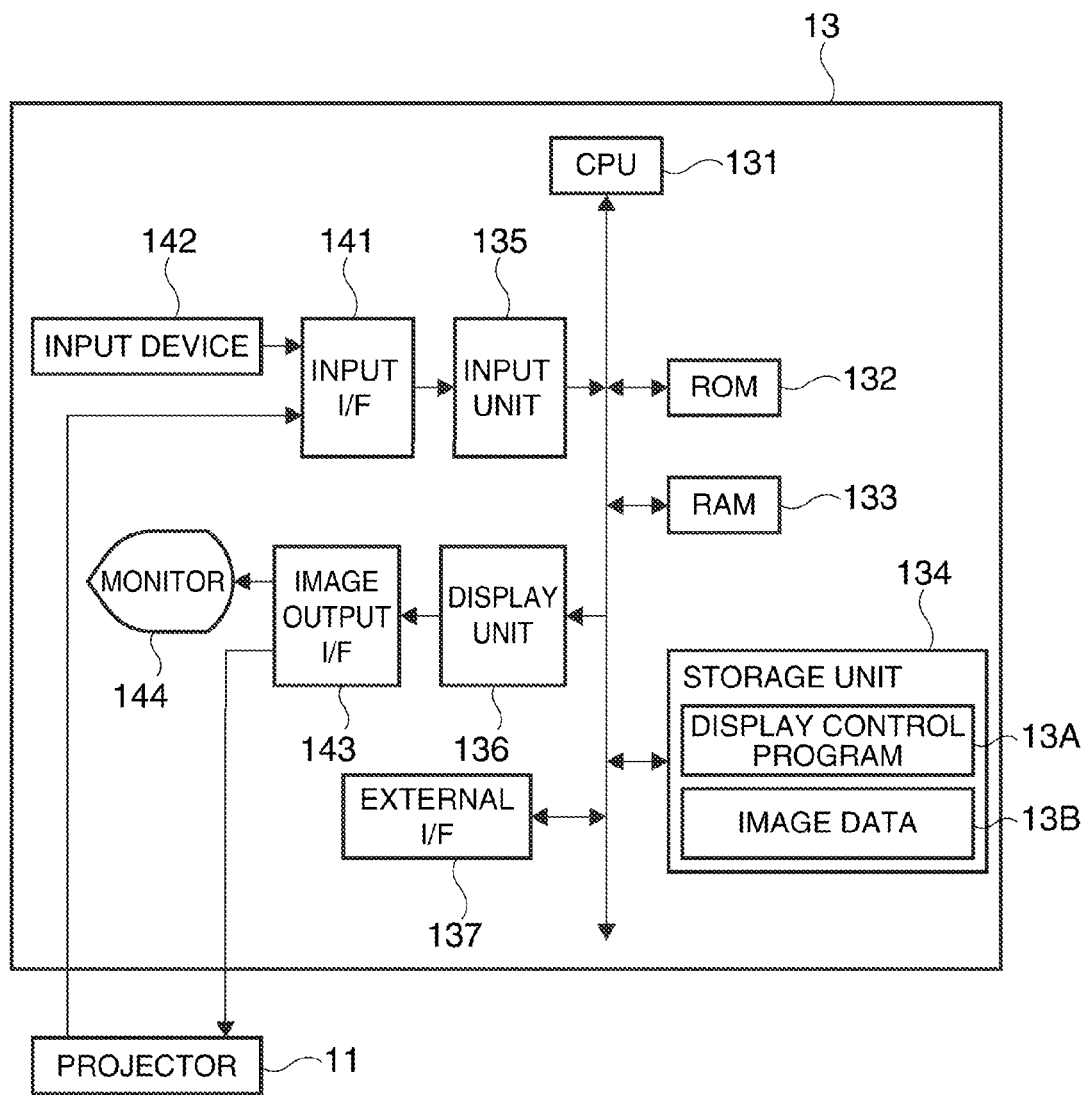
FIG. 3 is a block diagram showing a functional configuration of a PC.

FIG. 3 is a block diagram showing a functional configuration of the PC 13.

As shown in FIG. 3, the PC 13 includes a CPU 131 that executes the control programs and centrally controls the respective parts of the PC 13, a ROM 132 that stores a basic control program to be executed by the CPU 131 and data on the program, a RAM 133 that temporarily stores the programs and the data executed by the CPU 131, a storage unit 134 that stores the programs and the data in a non-volatile manner, an input unit 135 that detects an input operation and outputs data and an operation signal indicating input contents to the CPU 131, a display unit 136 that outputs display data for displaying processing results by the CPU 131 etc., and an external I/F 137 that transmits and receives data etc. between an external device and itself, and these respective units are connected to one another via a bus.

The input unit 135 is connected to an input I/F 141 having a connector and a power supply circuit, and an input device 142 is connected to the input I/F 141. The input I/F 141 includes a general-purpose interface for input device such as a USB interface, for example, and the input device 142 is a keyboard or a pointing device such as a mouse or a digitizer.

A communication cable (for example, the USB cable 62) in connection to the projector 11 is connected to the input I/F 141, and the coordinates of the pointed location by the pointing tool 12 are input from the projector 11. Here, to the input I/F 141, the coordinate data output by the projector 11 is input as the same data as the coordinate data output by the pointing device such as a mouse, a trackball, a digitizer, or a pen tablet. Therefore, the PC 13 may process the coordinate data input from the projector 11 as an input signal from the input device, and may perform an operation of moving the mouse cursor and the pointer based on the coordinate data, for example.

The display unit 136 is connected to an image output I/F 143 having a connector for image signal output or the like, and image signal cables (for example, the RGB cables 61) in connection to a monitor 144 and the projector 11 are connected to the image output I/F 143. The image output I/F 143 has pluralities of VGA terminals to which analog video signals are output, DVI interfaces to which digital video signals are output, USB interfaces, LAN interfaces, S-video terminals to which composite video signals of NTSC, PAL, SECAM, etc. are output, RCA terminals to which composite video signals are output, D-terminals to which component video signals are output, HDMI connectors compliant to the HDMI (registered trademark) standard, etc., for example, and the monitor 144 and the projector 11 are respectively connected to one of connectors, respectively. Further, the image output I/F 143 may have a DisplayPort designed by VESA, and specifically have a DisplayPort connector or a Mini Displayport connector and an interface circuit compliant to the Displayport standard. In this case, the PC 13 may output digital video signals to the projector 11, the monitor 144, or another device via the Displayport. Note that the image output I/F 143 may transmit and receive image signals via wired communication or transmit and receive image signals via wireless communication.

The storage unit 134 stores a display control program 13A to be executed by the CPU 131, and image data 13B to be output at execution of the display control program 13A. The CPU 131 executes the display control program 13A, and then, executes processing of transmitting the image data 13B to the projector 11. In this processing, the CPU 131 reproduces the image data 13B, and generates an image signal with predetermined display resolution using the display unit 136 and outputs the signal to the image output I/F 143. Here, the display unit 136 outputs an analog image signal to the connector to which an analog signal is output and outputs digital image data to the connector to which digital data is output. The image data 13B may be image data captured the screen displayed by the PC 13.

Further, when the coordinates in response to the operation of the pointing device are input from the input unit 135 during the execution of the display control program 13A, the CPU 131 generates an image for displaying a pointer 12A (FIG. 1) in a location corresponding to the coordinates. Then, the CPU 131 generates image data with the pointer 12A superimposed on the image data 13B being reproduced, and outputs the image data from the image output I/F 143 to the projector 11.

Further, the display control program 13A is a program for controlling projector having a function of controlling the projector 11 to command execution of multi-window display and designating the area in which the input image of the PC 13 is displayed in multi-window display. By execution of the display control program 13A, the PC 13 may not only output the image to the projector 11 but also transmits and receives control data etc. Accordingly, the CPU 131 may generate the image formed by drawing the trace of the operation of the pointing tool 12 with a line based on the coordinate data input to the input I/F 141 from the projector 11, for instance, and output the image to the projector 11.

In this manner, in the display system 10, a function of superimposing and drawing a new image (additional image) on the image (original image) represented by the original image data may be executed in both the image processing unit 110 of the projector 11 and the PC 13. Specifically, when the drawing function is executed in the image processing unit 110 of the projector 11, the image processing unit 110 superimposes and draws the additional image on the original image represented by the image data that the PC 13 outputs to the projector 11. On the other hand, when the drawing function is executed in the PC 13, the PC 13 superimposes and draws the additional image on the original image and outputs the image data representing the original image with the additional image superimposed thereon to the projector 11. Note that, though the pointer 12A has been exemplified as the additional image drawn by the drawing function, another additional image than the pointer 12A can be drawn by the drawing function.

The image data representing the original image may be output to the projector 11 by the PC 13 or stored by the projector 11. Further, as described above, the drawing function of the additional image may be executed in both the projector 11 and the PC 13.

For example, when the image data representing the original image is stored by the projector 11 and the additional image is drawn in the projector 11, drawing may be performed on the original image without using the PC 13.

Further, when the additional image is drawn on the original image output from the PC 13 in the projector 11, drawing of the additional image may be performed on the original image if the PC 13 does not have the drawing function, and thus, drawing may be performed on the original image unless drawing software of the PC 13 is installed.

Furthermore, the image data representing the original image may be stored in the projector 11 or the PC 13 and the additional image may be drawn on the original image in the PC 13.

Figure 4A:
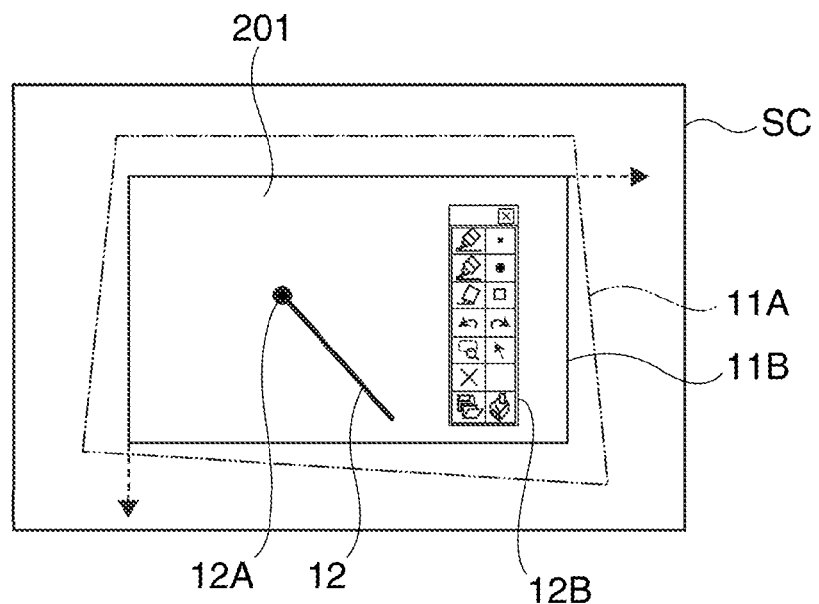
FIGS. 4A and 4B show examples of projection of images on a screen.
Figure 4B:
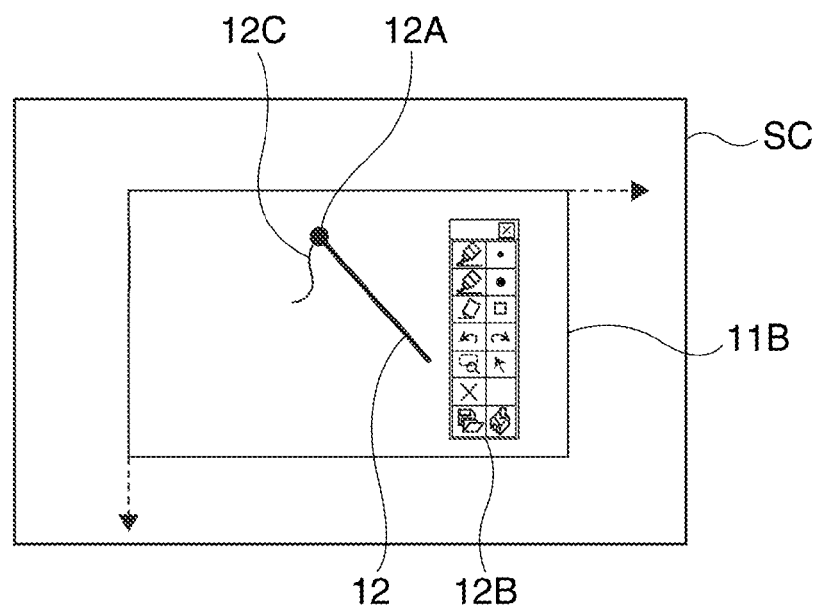

FIGS. 4A and 4B show examples of projection of images on the screen SC by the projector 11, and FIG. 4A shows a state in which the pointer 12A is projected according to the pointed location of the pointing tool 12 and FIG. 4B shows a state in which a drawn FIG. 12C is drawn according to the pointed location.

When a display image is projected using the entire liquid crystal panels of the light modulator 32, an image is formed in the projectable area 11A shown by a dashed-two dotted line in FIG. 4A. Trapezoidal distortion is produced as shown in FIG. 4A except the case where the projector 11 is positioned right in front of the screen SC, and the projector 11 performs keystone correction using the function of the display control part 107. After the execution of the keystone correction, a display image is projected in the effective projection area 11B. Typically, the effective projection area 11B is set to form a rectangular shape with the maximum size on the screen SC. Specifically, the size is determined by the resolution of the liquid crystal panels of the light modulator 32 and the degree of the trapezoidal distortion and not necessarily the maximum size.

The calibration execution part 103A of the projector 11 executes calibration in the effective projection area 11B after the keystone correction. In the calibration, the calibration execution part 103A controls the image processing part 113 to draw a predetermined image for calibration. In the state in which the image for calibration is projected on the screen SC, the location detection unit 150 images the screen SC under the control of the calibration execution part 103A. The image for calibration is an image in which dots are arranged on a white background, for example, and stored in the memory unit 105 or the like in advance. Note that the image for calibration is not necessarily stored in the memory unit 105 or the like, but the calibration execution part 103A may generate an image for calibration at each time when execution of calibration is necessary and the calibration is executed.

The calibration execution part 103A detects a contour of the display image in the taken image data, i.e., a boundary between the outside of the effective projection area 11B and the effective projection area 11B and dots in the taken image data, and specifies a correspondence relationship among an imaging range (angle of view) of the location detection unit 150, i.e., a location in the taken image data, a location on the effective projection area 11B, and a location on the image drawn by the image processing part 113. The calibration execution part 103A obtains a coordinate conversion parameter used by the coordinate calculation part 159 based on the correspondence relationship between the location on the taken image specified by the calibration and the location on the effective projection area 11B. The coordinate conversion parameter includes data associating coordinates on the image drawn by the image processing part 113 with coordinates obtained on the taken image data. The coordinate calculation part 159 may convert the coordinates obtained on the taken image data into the coordinates on the image drawn by the image processing part 113 based on the coordinate conversion parameter. The coordinate calculation processing is performed based on the coordinate conversion parameter.

The calibration is performed by execution of a program for calibration (not shown) stored in the memory unit 105 by the control unit 103, and thus, it is not necessary to install and execute the program for calibration in the PC 13. Further, the calibration may be processing automatically performed by the calibration execution part 103A based on the taken image data or processing requiring use's operation for the image for calibration. Furthermore, the projector 11 may use the two kinds of processing in combination. As a conceivable operation for the image for calibration by the user, there is an operation of pointing a dot contained in the image for calibration by the user using the pointing tool 12 or the like.

The location detection unit 150 of the projector 11 executes imaging in the state in which the image is projected in the effective projection area 11B, virtually sets orthogonal coordinates with their origin at a corner of the effective projection area 11B in the taken image as shown by dashed arrows in the drawings, and obtains coordinates of the tip end location of the pointing tool 12 in the coordinate system. The orthogonal coordinates are set based on the coordinate conversion parameter obtained by the calibration. Subsequently, when the coordinates of the tip end of the pointing tool 12 in the image data displayed in the effective projection area 11B are obtained by the coordinate conversion part 160, the pointer 12A and a menu bar 12B shown in FIG. 4A, for example, are displayed according to the coordinates. The pointer 12A is drawn as a sign indicating the tip end location of the pointing tool 12. Further, the menu bar 12B is a GUI that can be operated by the pointing tool 12, and GUI operation of executing functions of drawing of a figure such as a line, saving, erasing, and copying of data of the drawn figure, or the like may be performed by pointing a button located on the menu bar 12B using the pointing tool 12. As a specific example, by moving the pointing tool 12 from the location shown in FIG. 4A to the location in FIG. 4B, a drawn FIG. 12C is drawn along a trace of the tip end of the pointing tool 12. The drawn FIG. 12C is drawn and superimposed by the display control part 107 on the image developed in the frame memory 115 by the image processing part 113 according to the coordinate data indicating the pointed location of the pointing tool 12 like the pointer 12A and the menu bar 12B, for example. Alternatively, the drawn FIG. 12C is drawn and superposed on the input image and output to the projector 11 by the PC 13.

Further, on the menu bar 12B, a button for control of slide show display of sequentially reading out plural images that can be externally supplied (for example, image data stored by an external storage device such as a USB flash memory connected to the USB interface of the external I/F 102 or the like), a button for settings on the function itself of the projector 11 (changes of the aspect ratio, changes of the color mode, etc.) or the like can be placed. When the pointed location of the pointing tool 12 is output from the output switching unit 163, the control unit 103 acquires its coordinates, specifies the button pointed in the menu bar 12B, and executes an operation in response to the pointing operation.

Figure 5A:
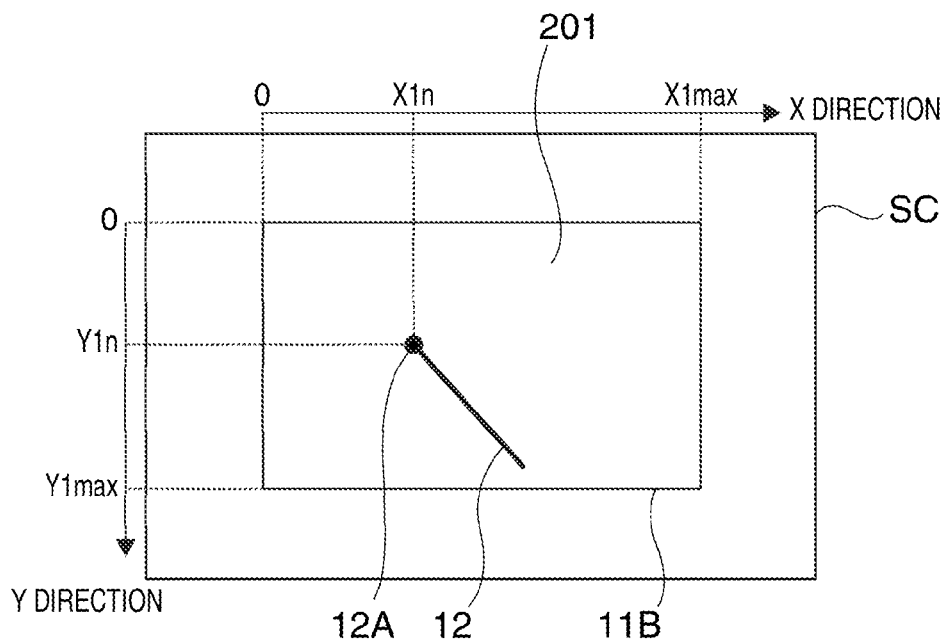
FIGS. 5A and 5B are explanatory diagrams showing processing of detecting and converting coordinates.
Figure 5B:
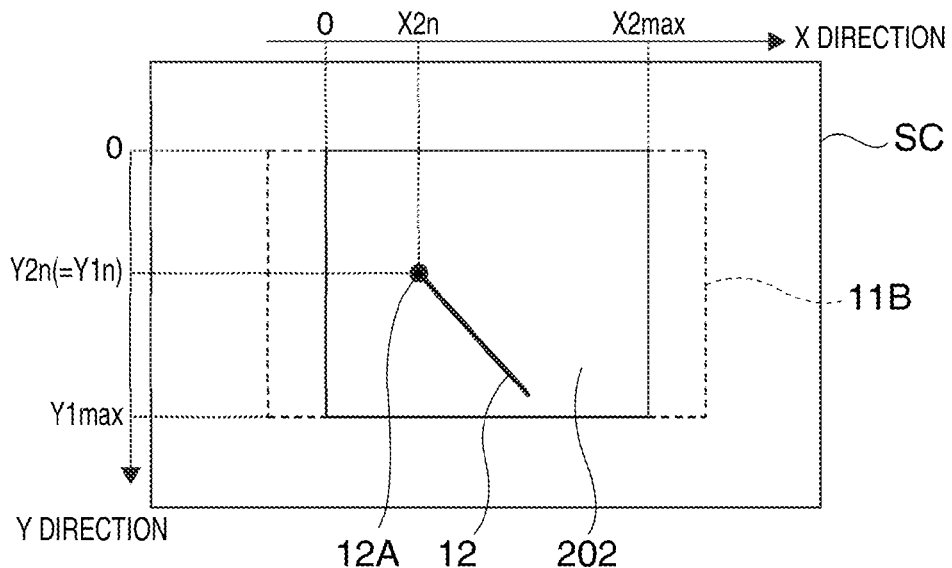
Figure 6A:
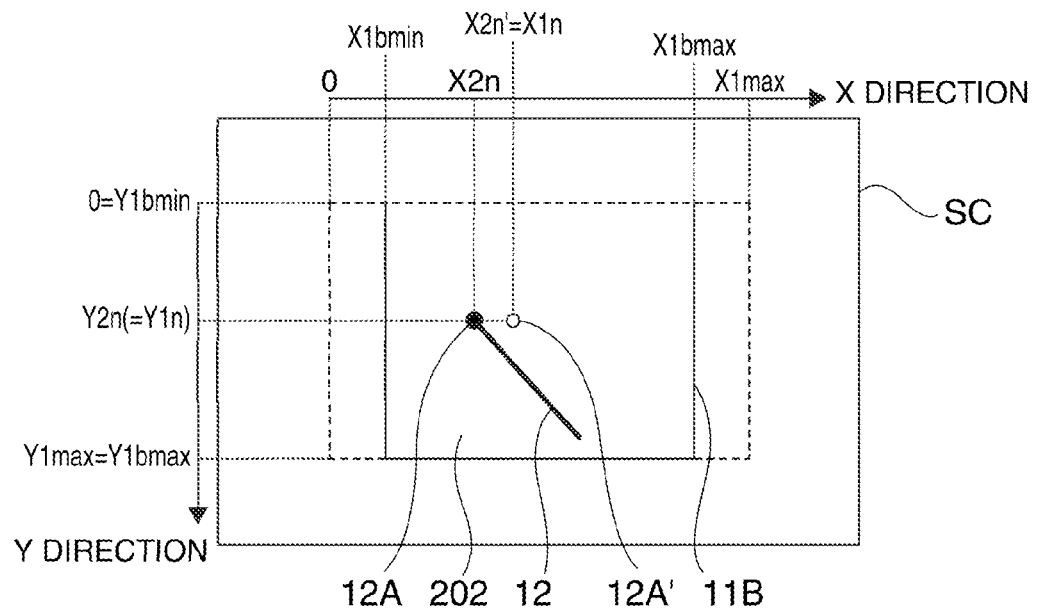
FIGS. 6A and 6B are explanatory diagrams showing the processing of detecting and converting the coordinates.
Figure 6B:
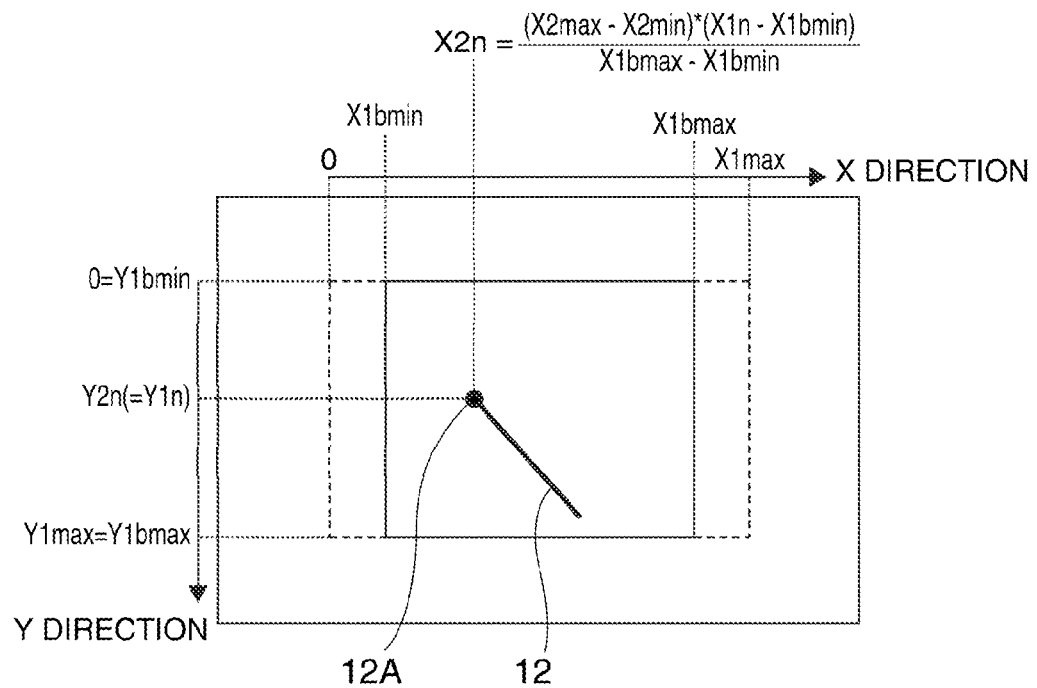

FIGS. 5A and 5B and FIGS. 6A and 6B are explanatory diagrams showing processing of detecting coordinates of a pointed location and converting them into coordinates in image data by the projector 11. FIG. 5A shows an initial state of the series of operation, FIG. 5B and FIGS. 6A and 6B show states in which resolution of the display image has been changed from the state in FIG. 5A by the PC 13. Further, as below, the explanation will be made on the assumption that the effective projection area 11B is equal to the projectable area 11A.

In the example shown in FIG. 5A, the resolution of the effective projection area 11B is 1280×800 dots and the resolution of the image data input from the PC 13 is also 1280×800 dots based on the resolution of the liquid crystal panels of the light modulator 32. Therefore, in the effective projection area 11B, a display image 201 of 1280×800 dots is displayed. The location detection unit 150 sets an X-Y orthogonal coordinate system with the origin at the upper left corner of the effective projection area 11B, the rightward direction in the X-axis direction, and the downward direction in the Y-axis direction, and sets the end location in the X direction of the display image 201 to X1max, the end location in the Y direction to Y1max, and coordinates of the pointed location of the pointing tool 12 to (X1$n$, Y1$n$).

When the image data input from the PC 13 is switched to a display image 202 with resolution of 1024×768 dots, the display image 202 of 1066×800 dots is projected on the screen SC as shown in FIG. 5B. The image data of 1066×800 dots is image data enlarged with the aspect ratio of 1024× 768 dots input from the PC 13 maintained. The display image 202 has the lower resolution than that of the display image 201, and thus, the area in which the display image 202 is projected is smaller than the effective projection area 11B.

Here, as shown in FIGS. 5A and 5B, when the pointing tool 12 on the screen SC is not moved, the pointed location itself is not moved, but the relative position between the displayed image and the pointed location changes. Accordingly, when the location detection unit 150 displays the pointer 12A according to the coordinates (X1$n$, Y1$n$) of the pointed location in the effective projection area 11B calculated based on the taken image data of the imaging part 153, the pointer 12A shifts from the actual pointed location.

That is, as shown in FIG. 6A, when the pointer is displayed at the coordinates (X1$n$, Y1$n$) in the coordinate system with the origin at the upper left corner of the changed display image 202, a pointer 12A' apart from the tip end of the pointing tool 12 is displayed. In this manner, the coordinates obtained with reference to the effective projection area 11B are affected by the resolution of the display image, and it may be impossible for the PC 13 or the image processing unit 110 to use the coordinates calculated by the location detection unit 150 for the display of the pointer 12A.

Accordingly, in order to deal with the case where the resolution of the display image output by the PC 13 changes, the projector 11 performs processing of converting coordinates (X1$n$, Y1$n$) of the pointed location calculated by the coordinate calculation part 159 of the location detection unit 150 into coordinates (X2$n$, Y2$n$) of the pointed location in the display image being displayed using the coordinate conversion part 160.

As below, specific processing will be explained.

In the embodiment, the coordinate conversion part 160 expresses the coordinates in the display image in a coordinate system (FIG. 5A) with the origin set at the corner of the effective projection area 11B. As shown in FIGS. 5B, 6A, and 6B, in the case where the display image (here, the display image 202) is displayed in an area smaller than the effective projection area 11B, the location detection processing part 157 detects the pointed location with the origin at the corner of the display image in the taken image of the imaging part 153, and the coordinate calculation part 159 specifies the location of the display image 202 in the effective projection area 11B and calculates the coordinates (X1$n$, Y1$n$) in the effective projection area 11B.

The coordinate conversion part 160 acquires image location information from the image processing part 113 and obtains coordinates (X1$b$min, Y1$b$min) of the upper left corner corresponding to the origin of the display image 202 after change. The coordinates (X1$b$min, Y1$b$min) are coordinates with the origin at the upper left corner of the effective projection area 11B.

Further, in the following computation, values of X2max, X2min are used. The X2max is the maximum value in the X-axis direction in the coordinate system with the origin at the upper left corner of the display image 202 when the display image 202 is displayed, and the X2min is the minimum value in the same coordinate system. That is, it is considered that the X2max is the coordinate at the right end of the display image 202 on the X-axis and the X2min is the origin, zero, however, normalized values are used as the values of X2max, X2min and not limited to X2min=0. Accordingly, computation is performed with the value as a variable X2min.

As shown in FIG. 6B, it is assumed that the coordinates of the upper left corner corresponding to the origin of the display image 202 are (X1$b$min, Y1$b$min), the coordinate value of the end in the X-axis direction of the effective projection area 11B is X1max, the end in the X-axis direction of the display image 202 is X1$b$max, the coordinate value of the end in the Y-axis direction of the effective projection area 11B is Y1max, and the end in the Y-axis direction of the display image 202 is Y1$b$max.

In this case, coordinates (X2$n$, Y2$n$) are calculated by the following equations (1), (2).

$$X2n=(X2\text{max}-X2\text{min})\times(X1n-X1b\text{min})\div(X1b\text{max}-X1b\text{min}) \quad (1)$$

$$Y2n=(Y2\text{max}-Y2\text{min})\times(Y1n-Y1b\text{min})\div(Y1b\text{max}-Y1b\text{min}) \quad (2)$$

In the embodiment, as shown in FIG. 6B, Y1$b$min=Y2min=0 and Y1$b$max=Y2max=Y1max. Accordingly, from the equation, Y2$n$=Y1$n$.

Actually, the coordinates of the pointed location are obtained as normalized logical coordinates. As an example, Xmin=0, X1max=32767, Y1min=0, and Y1max=32767.

Further, in the following example, the effective projection area 11B is set according to the image with resolution of 1280×800 dots and, when the coordinates in the effective projection area 11B are expressed by (XP$n$, YP$n$), it is assumed that (XPmin≤XP$n$≤XPmax, YPmin≤YP$n$≤YPmax) holds and XPmin=0, XPmax=1280, YPmin=0, and YPmax=800.

Furthermore, as information on the location and the size of the display image displayed in the effective projection area 11B, it is assumed that coordinates at the upper right end of the display image is (XP0, YP0) and (XP0, YP0)=(0,0) in this example, and the size in the X-axis direction of the display image is WP0=1280 and the size in the Y-axis direction of the display image is HP0=800.

The coordinates (X1$b$min, Y1$b$min) of the upper left corner and the coordinates of the end location (X1$b$max, Y1$b$max) of the display image in the effective projection area 11B are obtained by the following equations (3) to (6).

$$X1b\text{min}=(X1\text{max}-X1\text{min})\times XP0\div(XP\text{max}-XP\text{min}) \quad (3)$$

$$X1b\text{max}=(X1\text{max}-X1\text{min})\times(XP0+WP0)\div(XP\text{max}-XP\text{min}) \quad (4)$$

$$Y1b\text{min}=(Y1\text{max}-Y1\text{min})\times YP0\div(YP\text{max}-YP\text{min}) \quad (5)$$

$$Y1b\text{max}=(Y1\text{max}-Y1\text{min})\times(YP0+HP0)\div(YP\text{max}-YP\text{min}) \quad (6)$$

The computations of the above equations (1) and (2) are performed based on the values obtained by the equations (3) to (6), and the coordinate conversion part 160 obtains the coordinates of the pointed location in the display image. The coordinates may be used as information for specifying the location in the image data when the PC 13 or the display control part 107 draws the pointer 12A, the menu bar 12B, or the drawn FIG. 12C in the image data to be processed. Accordingly, the pointer 12A, the menu bar 12B, and the drawn FIG. 12C may be correctly drawn according to the pointed location by the pointing tool 12 without being affected by the resolution, the zooming factor, or the like of the display image.

However, the location and the size of the display image displayed in the effective projection area 11B are affected by the resolution and the display location of the display image. For example, when the projector 11 executes processing of changing the projection state such as changing of the display resolution, changing of the aspect ratio, zooming, changing (moving) of the display location of the image, or multi-window display processing in response to the operation using the operation panel 41 or the remote receiver unit 45 or the control signal transmitted from the PC 13, the image location information (XP0, YP0, WP0, HP0) also changes. Here, the image location information is information on arrangement of image arrangement areas (areas in which the display images 201, 202 are projected (displayed)) with respect to the effective projection area 11B. In other words, the image location information is information indicating location (arrangement) of the display images with respect to the effective projection area 11B (displayable area). Further, when the display resolution of the PC 13 changes and the resolution of the image data output to the projector 11 by the PC 13 (for example, when the setting on the resolution is changed in the PC 13), the image location information also changes.

FIGS. 7A to 7C and FIGS. 8A to 8D are explanatory diagrams showing changes of the projection state of an image and processing of converting coordinates, and showing examples in which the image location information (XP0, YP0, WP0, HP0) changes due to changes of the projection state.

Figure 7A:
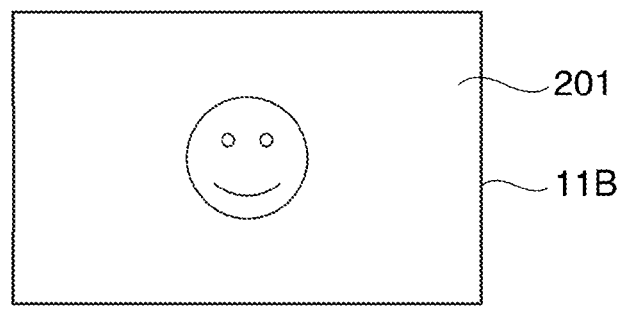
FIGS. 7A to 7C are explanatory diagrams showing changes of a projection state of an image and processing of converting coordinates.
Figure 7B:
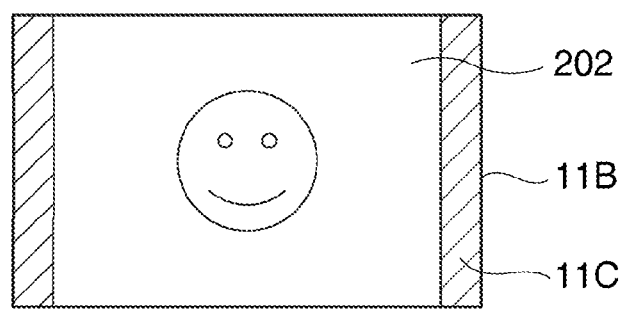

In FIG. 7A, the display image 201 with the same aspect ratio as that of the effective projection area 11B is displayed in the whole effective projection area 11B. The resolution of the display image 201 is 1280×800. The image location information in this case is (XP0=0, YP0=0, WP0=1280, HP0=800). Here, when the display image is changed to the display image 202 with the different resolution (1066×800), as shown in FIG. 7B, non-display areas 11C are produced around the display image 202. In this case, the image location information is (XP0=107, YP0=0, WP0=1066, HP0=800).

Figure 7C:
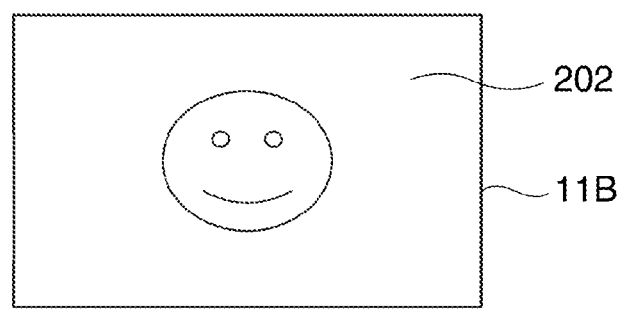

Here, when the aspect ratio of the display image 202 is changed for enlarged display in the entire effective projection area 11B, as shown in FIG. 7C, the display image 202 is displayed to fill the effective projection area 11B, and the image location information is (XP0=0, YP0=0, WP0=1280, HP0=800).

In the case where the non-display area 11C is produced and the pointed location of the pointing tool 12 is superimposed on the non-display area 11C, the coordinate conversion part 160 may not output the coordinates of the pointed location or may output the coordinates of the location nearest the pointed location within the range of the display image 202 to the output switching unit 163.

Specifically, the coordinate conversion part 160 determines whether or not the coordinates calculated by the coordinate calculation part 159 correspond to the non-display area 11C based on the image location information before coordinate conversion processing. Here, when the coordinates calculated by the coordinate calculation part 159 correspond to the non-display area 11C, the coordinate conversion part 160 determines whether or not the coordinates in the X-axis direction and the coordinates in the Y-axis direction respectively correspond to the non-display area 11C (whether or not the coordinates are contained in the effective projection area 11B), and, when the coordinates correspond to the non-display area 11C, determines which of the larger coordinate side or the smaller coordinate side contains the coordinates in the non-display area 11C. For example, in FIG. 7B, when the pointed location is superimposed on the left non-display area 11C of the display image 202, the coordinates in the X-axis direction of the pointed location is contained in the non-display area 11C with the smaller values. When the coordinate conversion part 160 has determined a deviation direction with respect to one of the coordinates in the X-axis direction and the coordinates in the Y-axis direction, the unit assigns the coordinates of the end location of the display image 202 in the deviation direction to the coordinates of the pointed location. When the pointed location is superimposed on the left non-display area 11C of the display image 202 in FIG. 7B, the value of the coordinate X1$n$ in the X-axis direction of the pointed location is changed to the value of the X1$b$min. Similarly, when the pointed location is superimposed on the right non-display area 11C of the display image 202, the value of the coordinate X1$n$ in the X-axis direction of the pointed location is changed to the value of the X1$b$max. The same may apply to the Y-axis direction.

That is, when the coordinates (X1$n$, Y1$n$) calculated by the coordinate calculation part 159 do not satisfy (X1$b$min≤X1$n$≤X1$b$max, Y1$b$min≤Y1$n$≤Y1$b$max), the coordinate conversion part 160 outputs one of (X1$b$min, Y1$n$), (X1$b$max, Y1$n$), (X1$n$, Y1$b$min), (X1$n$, Y1$b$max) to the output switching unit 163. Thereby, with respect to the pointed location not contained in the display image, the coordinates may be output and the pointer 12A or the menu bar 12B may be drawn near the pointed location.

Figure 8A:
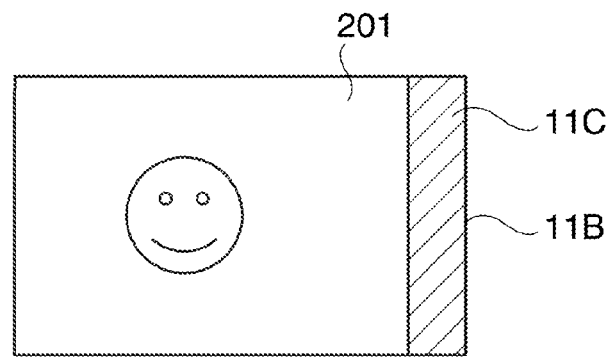
FIGS. 8A to 8D are explanatory diagrams showing changes of a projection state of an image and processing of converting coordinates.

Further, the display location of the display image 201 is shifted from the state shown in FIG. 7A to the left by the amount of 160 dots, as shown in FIG. 8A, the left side of the display image 201 is out of the screen and the non-display area 11C is produced on the right of the display image 201. In the state in FIG. 8A, the image location information is (XP0=−160, YP0=0, WP0=1280, HP0=800). Note that, in FIG. 8A, the case where the display location of the display image 201 is shifted to the left is exemplified, however, the display image 201 may be moved in another direction than the left (right, upward, or downward).

Figure 8B:
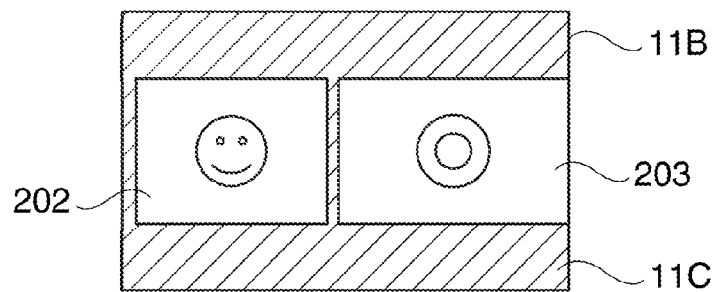

FIG. 8B shows an example of displaying the display image 202 and a display image 203 by the multi-window display function. In this example, the two display image 202 and display image 203 are reduced with their aspect ratios kept so as to be displayed in the effective projection area 11B side by side, and the non-display area 11C is produced around them. In the case where the plural display images are displayed at the same time by the multi-window display function, the image location information may be defined on the respective display images. In the case as shown in FIG. 8B, different image location information may be defined on the respective display image 202 and display image 203. The resolution of the display image 201 after reduction becomes 533×400 in halves in the longitudinal and lateral directions, and the image location information on the display image 202 is (XP0=53, YP0=200, WP0=533, HP0=400).

The projector 11 can enlarge or reduce one of the respective display image 202 and the display image 203 at execution of the multi-window display function. In this case, when the user performs operation of commanding enlargement or reduction of one of the display images 202, 203 with the pointing tool 12, the projector 11 enlarges or reduces the pointed display image in response to the operation, and updates the image location information of the enlarged or reduced display image.

Note that the opportunity when the projector 11 executes the multi-window display function is not only when the PC 13 transmits the control data of commanding start of the multi-window display to the projector 11, when the user commands start of the multi-window display via the operation panel 41, the remote, or the like, but the projector 11 itself may take the opportunity when a predetermined condition is fulfilled and start the multi-window display function. For example, the projector 11 may start the multi-window display function when the control unit 103 detects inputs of the input images from the plural image sources via the external I/F 102 or when the multi-window display start button of the menu bar 12B is operated by the operation of the pointing tool 12 detected by the location detection unit 150.

Figure 8C:
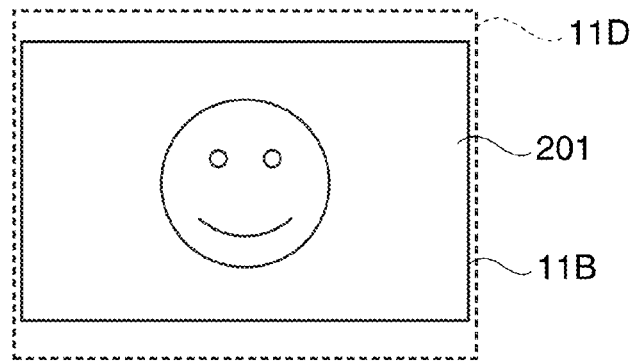
Figure 8D:
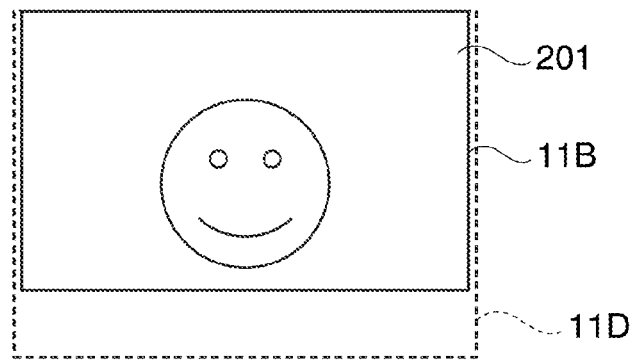

The projector 11 has a zoom function of enlarging an image larger than the effective projection area 11B and displaying a part thereof. FIG. 8C shows an example in which the display image 202 shown in FIG. 7B is enlarged with resolution 1.25 times the original resolution. In the example in FIG. 8C, a virtual display area 11D larger than the effective projection area 11B is necessary for display of the entire display image 202, and actually, only the part within the effective projection area 11B at the center of the display image 202 is displayed. The image location information is determined with reference to the coordinates of the corner of the virtual display area 11D and the resolution of the virtual display area 11D to be (XP0=−27, YP0=−100, WP0=1333, HP0=1000). Further, the display location in the display image enlarged by the zoom function may be shifted. FIG. 8D shows a state in which the enlarged display image 202 shown in FIG. 8C is shifted downward by an amount of 100 dots. The processing corresponds to processing of moving the virtual display area 11D downward relative to the effective projection area 11B, and the image location information is (XP0=−27, YP0=0, WP0=1333, HP0=1000). Note that, in FIG. 8A, the case where the display location of the display image 201 is shifted downward is exemplified, however, the display image 201 may be moved in another direction than the downward (upward, right, or left).

The coordinate conversion part 160 acquires information from the control unit 103 and the display processing unit 110, updates the image location information, and converts the coordinates based on the updated image location information at each time when the projection state (display state) of the display image by the projection part 30 changes. For example, the image location information is updated at the following times.

when the control unit 103 detects input of image data from the PC 13 when the control unit 103 detects a change in information on image data input from the PC 13 (resolution of an image or the like)

when the resolution of image data is changed in the projector 1 when the aspect ratio of image data is changed when a digital zoom function of enlarging/reducing an image drawn by the light modulator 32 by image processing of image data to be projected is executed or terminated when the display location of a display image with respect to the effective projection area 11B is changed when an image is enlarged by the digital zoom function, and a function of changing the display location of the image by image processing is executed or terminated when a tele/wide function of enlarging/reducing the projection size of the whole including the images drawn by the light modulator 32 and the background, i.e., the entire effective projection area 11B by performing image processing of image data is executed or terminated when an image is reduced by the digital zoom function, and a picture shift function of changing the display location of the image by image processing is executed or terminated when simultaneous display of images (multi-window display) is executed or terminated when an output destination to which coordinates are output from the output switching unit 163 is changed from the image processing unit 110 to the PC 13 or vise versa All of changing of the resolution, changing of the aspect ratio, and execution and termination of the various functions are executed by the image processing unit 110 under the control of the control unit 103. Note that the listed times are just examples and, obviously, image location information can be updated at other times.

Figure 9:
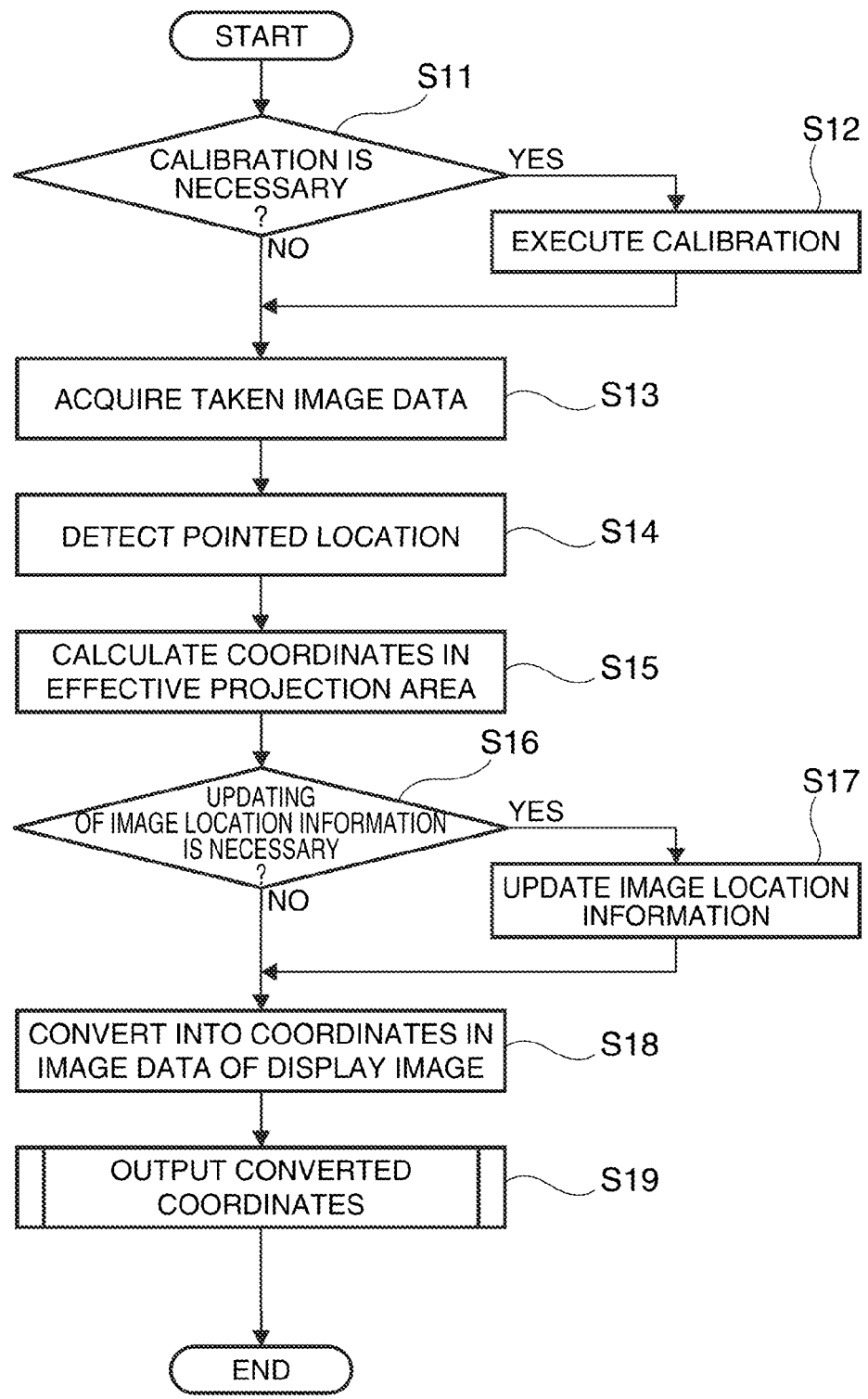
FIG. 9 is a flowchart showing an operation of the projector.

FIG. 9 is a flowchart showing an operation of the projector 11, and specifically shows an operation of detecting a pointed location by the pointing tool 12 and outputting coordinates of the pointed location.

The operation shown in FIG. 9 is repeatedly executed at regular time intervals after the projector 11 is activated, or when display of the pointer 12A and the menu bar 12B is commanded by an operation of the operation panel 41 or the remote receiver unit 45 or when location detection is commanded by the operation panel 41 or the remote receiver unit 45.

First, whether or not calibration is necessary is determined (step S11). The determination may be performed according to the user's command indicating whether or not calibration is necessary. Or, whether or not calibration is necessary may be automatically determined by the calibration execution part 103A and the calibration may be automatically performed based on the determination result. If calibration is necessary (step S11; Yes), the calibration is executed as has been explained with reference to FIG. 4A (step S12). That is, an image for calibration is drawn by the image processing part 113, imaging is executed by the location detection unit 150 with the image for calibration projected, the contour of the effective projection area 11B in the obtained taken image data and feature points (dots or the like) contained in the image for calibration are detected, and thereby, the correspondence relationship between the image drawn by the image processing part 113 and the taken image data is obtained. Note that it is necessary to perform the calibration only once after the start of use of the projector 11, and not necessary to perform it again unless a specific event occurs. For example, in the cases of the following (1) to (3), it is necessary to perform new calibration.

(1) where keystone correction has been performed (2) where an install condition of the projector 11 is changed, for example, where the relative position (including the direction) of the projector 11 with respect to the screen SC has been changed (3) where an optical condition has been changed, for example, where the focus or zoom condition of the projection system 33 has been changed and where the optical axis of the projection system 33 or the imaging part 153 has been varied due to change with time or the like If these events occur, the correspondence relationship between the location on the taken image data in the initial state and the location on the image drawn by the image processing part 113 as reference for calculation of coordinates by the coordinate conversion part 160 changes, and it is necessary to newly perform calibration. If these events do not occur, it is not necessary to perform calibration again. If the events have not occurred after the previous use of the projector 11 before the use at this time, the coordinate conversion parameter obtained in the previous calibration may be reused without new calibration. Methods for the calibration execution part 103A to determine whether or not calibration is necessary include, for example, a method of determining it based on whether or not there is an operation of the switch for commanding execution of keystone correction in the operation panel 41, and a method of providing a sensor of detecting a tilt or motion in the projector 11 and determining it based on a change in detection value of the sensor. Or, when adjustment of focus or zoom in the projection system 33 is performed, the calibration execution part 103A may automatically execute the calibration. Or, for the user to know a change in installation location and optical condition of the projector 11 and perform the operation of commanding calibration execution, a corresponding switch may be provided on the operation panel 41 or the operation part of the remote or the like.

When the image control part 155 allows the imaging part 153 to image the range containing the effective projection area 11B under the control of the control unit 103, the location detection processing part 157 acquires the taken image data (step S13) and detects the pointed location of the pointing tool 12 based on the taken image data (step S14). Subsequently, the coordinate calculation part 159 calculates the coordinates of the pointed location detected by the location detection processing part 157 (step S15). The coordinates calculated at step S15 are coordinates in the effective projection area 11B and the coordinates ($X1n$, $Y1n$) explained in FIG. 5A.

The coordinate conversion part 160 determines whether or not updating of the image location information is necessary (step S16) and, if updating is necessary, acquires information from the control unit 103 and the image processing unit 110 and updates the image location information (step S17). The processing at step S17 may be executed not limited at the time after step S15, but at the above exemplified times as the need arises.

Then, the coordinate conversion part 160 performs processing of converting the coordinates calculated by the coordinate calculation part 159 into coordinates in the image data of the display image and outputs the converted coordinates to the output switching unit 163 (step S18). The converted coordinates are the coordinates (X2n, Y2n) explained in FIG. 5B.

The output switching unit 163 outputs the converted coordinates to the designated side of the external I/F 102 or the image processing unit 110 (step S19), and the process is ended.

The output control unit 101 controls the output switching unit 163 to perform control of switching output of the converted coordinates converted by the coordinate conversion part 160. The output control unit 101 allows the output switching unit 163 to select the PC 13 that supplies the input image being displayed by the projection part 30 from the image sources connected to the external I/F 102 as the output destination to which the coordinates calculated by the coordinate conversion part 160 are output. Further, the output control unit 101 can allow the unit to select the image processing unit 110 as the output destination of the output switching unit 163.

Furthermore, the output control unit 101 has a function of identifying the image source that supplies the image being currently displayed for determination of the image source as the output destination to which the coordinates converted by the coordinate conversion part 160 are output.

In addition, when AV mute is commanded by the operation detected by the operation panel 41 or the remote receiver unit 45, the control unit 103 temporarily stops projection to the screen SC. Specifically, when the command of AV mute is detected, the control unit 103 switches the display data output to the light modulator drive part 119 by the display control part 107 to data representing black on the entire screen. By the operation, all pixels of the liquid crystal panel of the light modulator 32 represent black, the transmittance of the light modulator 32 becomes nearly zero, and thus, no image is projected on the screen SC and the amount of projection light also becomes nearly zero. With the operation, the control unit 103 may control the light source drive part 117 to reduce the amount of light of the light source of the light source drive part 117. Then, when the termination of AV mute is commanded by the operation detected by the operation panel 41 or the remote receiver unit 45, the control unit 103 controls the display control part 107 to return the light modulator 32 into the normal display state, and returns the luminance of the light source of the light source drive part 117 to the normal luminance according to need.

Figure 10:
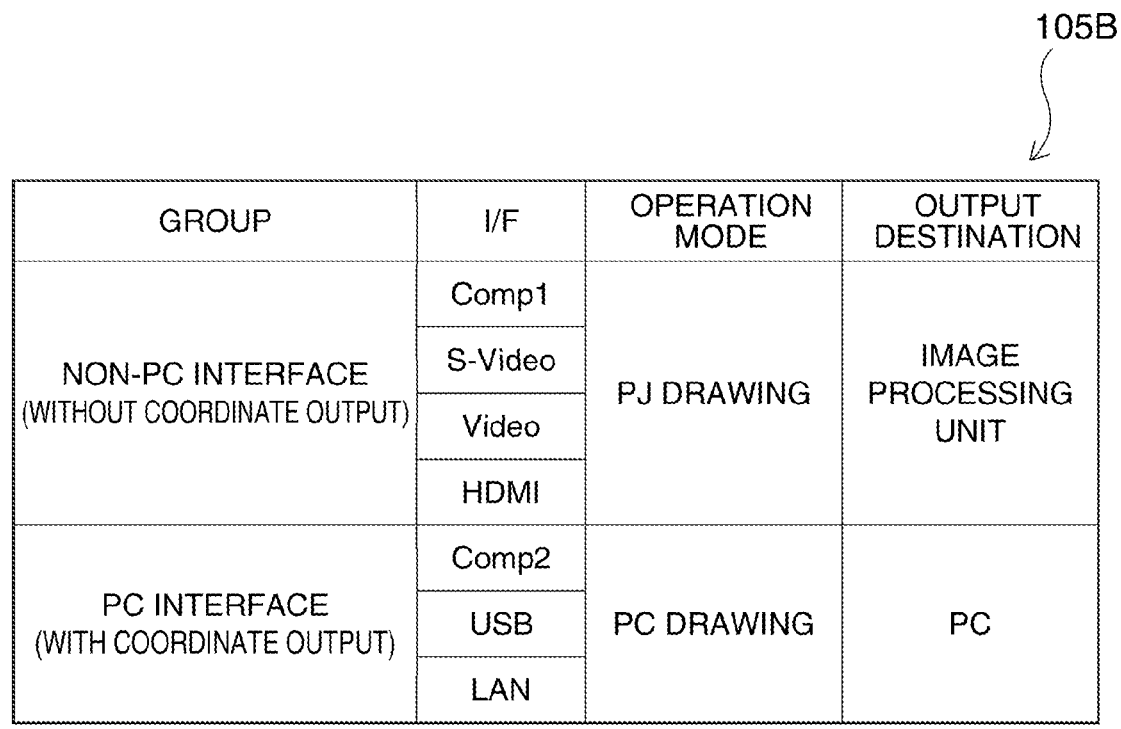
FIG. 10 schematically shows a configuration of setting data that define whether or not coordinates are allowed to be output with respect to each type of image source.

FIG. 10 schematically shows a configuration example of setting data 105B that define whether or not coordinates are allowed to be output with respect to each type of image source.

In the examples in FIG. 10, the respective interfaces of the external I/F 102 are classified into two groups of PC interfaces and non-PC interfaces. In the embodiment, the example in which classification into two groups of PC interfaces and the other non-PC interfaces according to the attributes as to whether or not the interface can transmit or receive the control data between the projector 11 and itself is shown. The interfaces belonging to the group of PC interfaces include a Comp interface (here, Comp 2) and USB and LAN interfaces. In the case where it is impossible to transmit or receive the control data via the Comp interface, however, in the case where the PC 13 is connected to the Comp interface by the RGB cable 61 and connected to the USB interface by the USB cable 62 as shown in FIG. 1, when the input image is input to the Comp interface, the control data can be transmitted and received via the USB interface. Accordingly, the PC interfaces may include the Comp interface. Further, the non-PC interfaces include a Comp interface (here, Comp 1) and the respective interfaces of S-Video, Video, HDMI.

Note that the grouping method is arbitrary as long as the respective grouped interfaces are reflected on the setting data 105B, and grouping can be performed independently of the attributes and functions of interfaces (analog interfaces or digital interfaces or the like).

The display system 10 can execute the operation of drawing the pointer 12A or the like to follow the pointed location pointed by the pointing tool 12 as described above, and the actual drawing may be performed by the image processing unit 110 of the projector 11 itself or by the PC 13. The operation mode of drawing by the image processing unit 110 is defined as "PJ interactive mode" and the operation mode of drawing by the PC 13 is defined as "PC interactive mode".

In the PJ interactive mode, the projector 11 executes processing according to the coordinates of the pointed location of the pointing tool 12 and, for example, the projector 11 displays the pointer 12A and the menu bar 12B to follow the pointed location of the pointing tool 12, and executes processing of moving the display locations of them and processing of drawing the trace 12D of the pointed location according to the coordinates of the pointed location, which will be described later.

On the other hand, in the PC interactive mode, as described above, the coordinate data output by the output switching unit 163 is treated equally to the coordinate data output by general-purpose pointing devices, and thereby, the pointing operation by the pointing tool 12 may be processed as the operation of the pointing device using general-purpose device driver programs installed in advance as a partial function of the OS of the PC 13. For example, processing of displaying the pointer 12A and the menu bar 12B to follow the pointed location of the pointing tool 12 and moving the display locations of them may be performed. Further, if the PC 13 executes specialized device driver programs for the projector 11, the unique function in addition to the function of the OS of the PC 13 may be realized. For example, the operation of the projector 11 can be controlled according to the pointing operation by the pointing tool 12 and start/end of execution of specific functions (the AV mute function, the multi-window display function, etc.), control during execution of the functions, or the like can be performed. The unique function may be arbitrarily set depending on the specifications of the specialized device driver programs.

In the PC interactive mode, the PC 13 draws the trace 12D based on the coordinate data input from the projector 11 using an application program having a drawing function of drawing images of the standard application programs supplied as part of the function of the OS of the PC 13 or with the OS. Further, the PC 13 may execute the specialized application program for the purpose of using the projector 11 and draw the trace 12D etc. by the drawing function of the application program. Furthermore, the specialized application program may be a program that functions in cooperation with the above described device driver program for controlling the projector 11. In this case, processing of acquiring the coordinates input from the projector 11 and displaying the pointer 12A, the menu bar 12B, etc. according to the coordinates and drawing according to the coordinates may be performed.

In the PJ interactive mode and the PC interactive mode, the projector 11 and the PC 13 may execute functions regarding changes of display states of images (for example, the above described drawing function, a function of adjusting shades and colors of images, etc.) and the functions regarding processing on drawn image data (for example, a function of recording drawn image data etc.) Further, the executable functions by the projector 11 and the PC 13 in the PJ interactive mode may be the same as or different from the executable functions in the PC interactive mode.

The display system 10 may switch between the PJ interactive mode and the PC interactive mode and execute it, however, the PC interactive mode may not be executed unless image data is input from the PC 13.

In the setting data 105B, executable operation modes are set with respect to each group of interfaces or each interface. In the example of FIG. 10, the PJ interactive mode is set in association with the non-PC interfaces and the PC interactive mode is set for the PC interfaces.

Further, in the setting data 105B, output destinations to which the output switching unit 163 outputs coordinates are set. For example, it is necessary to output coordinates to the PC 13 in the PC interactive mode, and it is necessary to output coordinates to the image processing unit 110 in the PJ interactive mode. In the setting data 105B, the output destinations are set with respect to each group and each operation mode. Since the PC interactive mode is set for the PC interfaces, the output destination is set to the PC 13.

As described above, by the setting data 105B, the types of interfaces of the external I/F 102, the operation modes (the PJ interactive mode, the PC interactive mode) to be executed, and the output destinations to which the output switching unit 163 outputs coordinate data are associated. The output control unit 101 controls the output switching unit 163 to switch the output destination of the coordinate data according to the setting of the setting data 105B.

Note that, in the setting data 105B, both the PC 13 and the image processing unit 110 may be set as the output destinations in association with any one group. Further, the operation of once outputting the coordinates from the output switching unit 163 to the image processing unit 110 and outputting the coordinates from the image processing unit 110 to the PC 13 (i.e., the operation of outputting the coordinates to the PC 13 via the image processing unit 110) and the operation of outputting the coordinates directly from the output switching unit 163 to the PC 13 via the external I/F 102 may be executed. In this case, if the PC 13 is set as the output destination in the setting data 105B, further, information for designating whether the coordinates are directly output from the output switching unit 163 to the PC 13 or output via the image processing unit 110 may be set.

Figure 11:
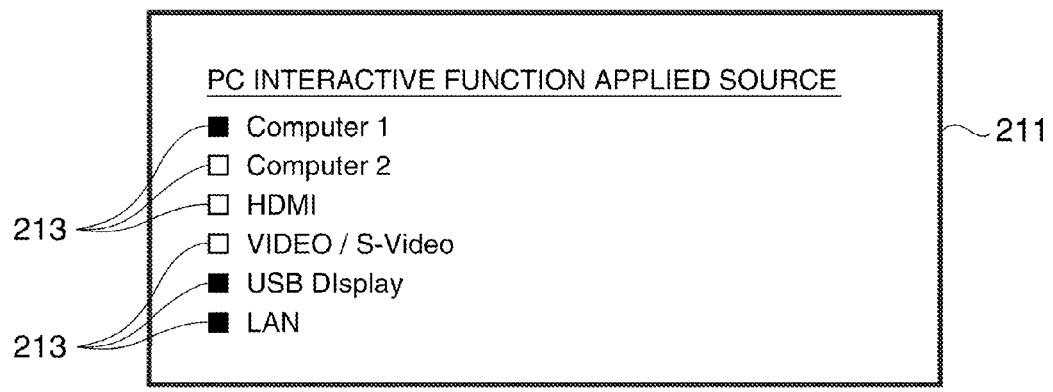
FIG. 11 shows an example of a setting window of an output destination.

FIG. 11 shows an example of a setting window 211 of an output destination.

The setting window 211 shown in FIG. 11 is a window displayed on the screen SC when the output destination of the coordinates is set and, for example, is displayed in response to the operation in the menu bar 12B or the operation detected by the operation panel 41 or the remote receiver unit 45 of the projector 11. The setting window 211 is displayed by the display control part 107 under the control of the control unit 103.

In the setting window 211, the names of the respective interfaces of the external I/F 102 are displayed in rows, and entry boxes 213 as to whether or not the interfaces are set to the PC interactive mode in correspondence with the names of the respective interfaces are arranged. While the setting window 211 is displayed, when the user performs the operation of designating the entry box 213 using the pointing tool 12, the selection state of the designated entry box 213 changes in response to the operation. When the entry box 213 is filled, the interface corresponding to the entry box 213 is associated with the PC interactive mode. Further, when the entry box 213 is blank, the interface corresponding to the entry box 213 is associated with another than the PC interactive mode, i.e., the PJ interactive mode. In the example of FIG. 11, the respective interfaces of Comp1, USB, LAN are associated with the PC interactive mode. In this manner, the setting window 211 is displayed on the screen SC, and the output destination of the coordinates may be easily set. Further, the operation of setting in the setting window 211 itself is realized by a GUI of moving the pointer 12A using the pointing tool 12. When the end of setting using the setting window 211 is commanded by the operation of the user, the control unit 103 generates or updates the setting data 105B to reflect the setting in the setting window 211.

Note that all of the names of the respective interfaces compatible with the projector 11 are displayed on the setting window 211 in the example of FIG. 11, however, the names of interfaces not associated with the PC interactive mode may not be displayed on the setting window 211 from the start of display of the setting window 211. In this case, only the names of interfaces that may be associated with the PC interactive mode are displayed on the setting window 211.

Further, in the configuration of the setting window 211 exemplified in FIG. 11, two or more of the names of interfaces to be associated with the PC interactive mode may be selected, however, the selectable name of interface may be limited to one. In this case, only the selected one interface is associated with the PC interactive mode and the other interfaces are not associated with the PC interactive mode.

Figure 12:
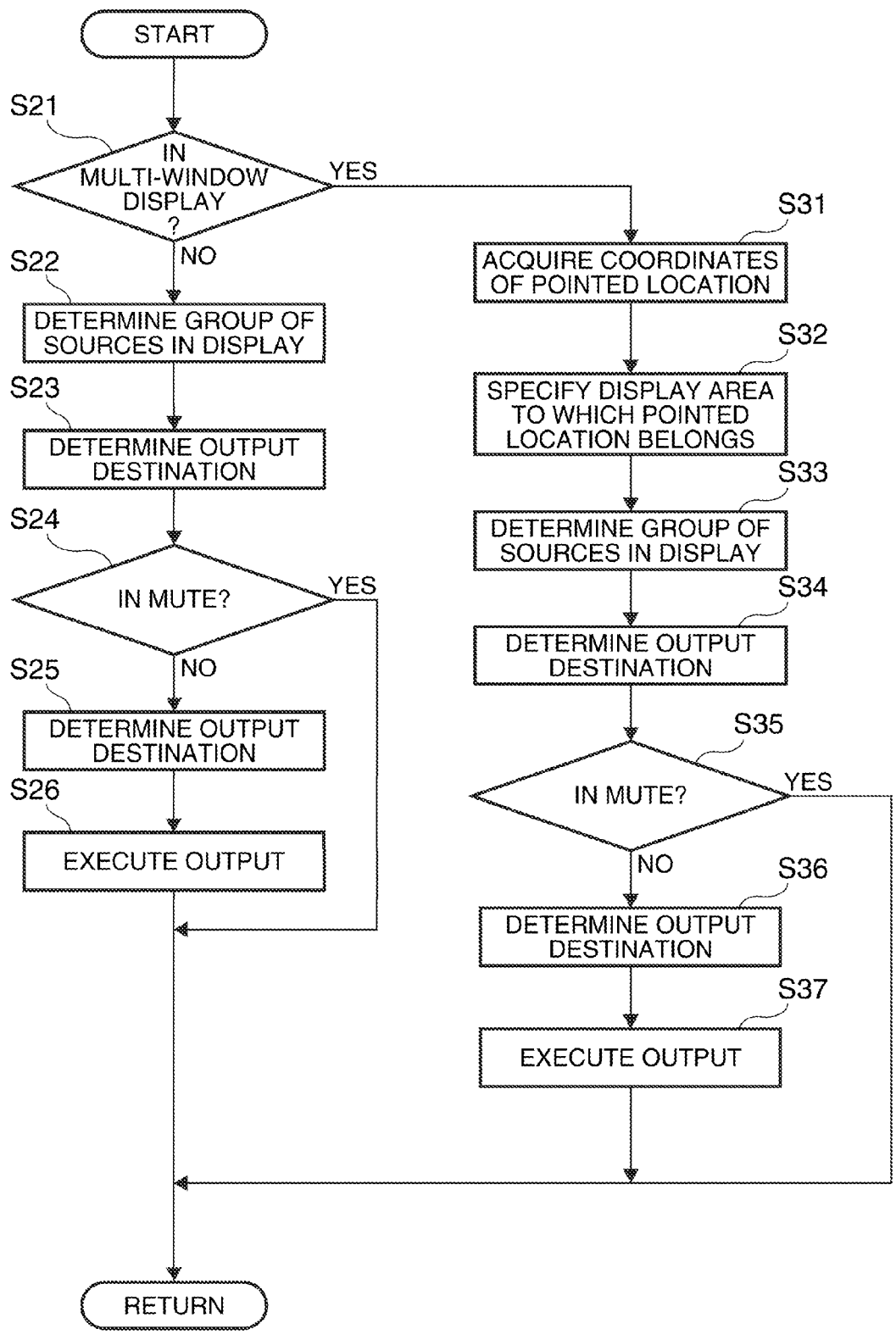
FIG. 12 is a flowchart specifically showing coordinate output processing shown at step S19 in FIG. 9.

FIG. 12 is a flowchart specifically showing coordinate output processing shown at step S19 in FIG. 9.

The output control unit 101 determines whether or not the projector 11 is in multi-window display (step S21). The multi-window display is a function of simultaneously displaying plural images in the effective projection area 11B of the screen SC by the display control part 107 as described above. During the multi-window display, the effective projection area 11B is divided into plural areas or plural areas are provided in the effective projection area 11B, and images input to the external I/F 102 are displayed in these respective areas.

Not during the multi-window display (step S21; No), the output control unit 101 discriminates the type of the image source that supplies the image being displayed (step S22). Here, the output control unit 101 refers to the setting data 105B exemplified in FIG. 10 according to the discriminated type of the image source, and determines whether the output destination of coordinates is the PC 13 or the image processing unit 110 according to the setting of the setting data 105B (step S23).

Subsequently, the output control unit 101 determines whether or not AV mute is being executed by the control unit 103 (step S24), and, if the mute is not being executed (step S24; No), output execution to the output destination determined at step S23 is determined (step S25), and the coordinate data converted by the coordinate conversion part 160 is output from the output switching unit 163 (step S26). Further, if the mute is being executed (step S24; Yes), the output control unit 101 ends the processing without outputting the coordinates. Here, the output control unit 101 may stop output of the coordinates from the coordinate conversion part 160 to the output switching unit 163 during AV mute or may stop output of the coordinates from the output switching unit 163 to the image processing unit 110 or the external I/F 102.

On the other hand, if the multi-window display of displaying plural input images in the effective projection area 11B is being executed (step S21; Yes), the output control unit 101 acquires the coordinates of the pointed location according to the coordinates of the latest pointed location (step S31), and specifies the display area to which the coordinates of the pointed location of the pointing tool 12 belong of the plural display areas arranged in the effective projection area 11B (step S32).

Then, the output control unit 101 identifies the image source that supplies the input image of the specified area and determines the group of the image source (step S33). The output control unit 101 refers to the setting data 105B according to the group of the image source determined at step S33, and determines the set output destination (step S34). The output control unit 101 determines whether or not AV mute is being executed (step S35), if the mute is not being executed (step S35; No), output execution to the output destination determined at step S25 is determined (step S36), and the coordinate data converted by the coordinate conversion part 160 is output by the output switching unit 163 (step S37). Further, if the mute is being executed (step S35; Yes), the output control unit 101 ends the processing without outputting the coordinates.

By the processing, when the projector 11 performs multi-window display, the output destination of the coordinate data may be switched in response to the area containing the pointed location of the pointing tool 12. For example, the case where, when the multi-window display as shown in FIG. 8B is performed, the image source of the display image 202 is associated with the PC interactive mode and the image source of the display image 203 is associated with the PJ interactive mode is considered. In this case, when the pointing tool 12 moves from the area corresponding to the display image 202 to the area corresponding to the display image 203, the output destination of the coordinate data may be switched in response to the movement of the pointing tool 12.

Note that, in multi-window display, input images input from the plural image sources connected to the PC interfaces may be displayed, and, in this case, the setting data 105B can be referred to with respect to all image sources and the coordinates can be output to the output destination set in the setting data 105B. Here, when the images supplied from the plural PCs 13 are displayed at the same time, the coordinates may be output to all PCs 13 or the coordinates may be output only to the preset part of the PCs 13. Further, whether or not the display control program 13A (FIG. 3) for controlling the projector 11 has been installed in the PCs 13 may be detected, and the coordinates may be output only to the PCs 13 in which the display control program 13A has been installed. The display control program 13A has a function of acquiring the pointed location of the pointing tool 12, generating the image of the trace of the pointed location or the image of the pointer 12A (FIG. 1) corresponding to the pointed location, synthesizing the image with the input image, and outputting it. Accordingly, it is rational to output the coordinates only to the PCs 13 that can execute the function. Furthermore, the information indicating the areas where the output images of the respective PCs 13 are displayed may be output with the coordinate data to the PCs 13. In this case, erroneous coordinate data is not output to the PCs 13 the input images of which are being displayed in the areas that do not overlap with the pointed location of the pointing tool 12.

In the embodiment, the coordinates are output to the image source corresponding to the area containing the pointed location of the pointing tool 12, however, in the case where images of all areas are images input from the PCs 13 and the traces are drawn in the PC interactive mode, the coordinates may be output to all of the PCs 13. In this case, the respective PCs draw the trace of the pointed location on the images output by themselves, and thereby, a continuous trace as a whole may be drawn.

Further, in the case where the trace is drawn in the PJ interactive mode even when images of part or all areas are images input from the other image sources than the PCs 13, the trace may be drawn by the function of the projector 11. In this case, the output control unit 101 may draw the continuous trace over the plural areas by outputting the coordinates from the output switching unit 163 to the image processing unit 110 according to the setting of the setting data 105B or independently of the setting data 105B.

Furthermore, only in the case where, during multi-window display, the output control unit 101 identifies the image sources as the supply sources of the respective images being displayed in the effective projection area 11B and all of the image sources are PCs 13, or all of the image sources are PCs 13 in which the display control program 13A has been installed, the coordinates are output to all the PCs 13, and, in the other cases, the output destination may be determined to be the image processing unit 110 independently of the setting data 105B. In this case, there is an advantage that the trace over the plural display areas may be surely drawn even if image sources are any devices.

In addition, in the operation shown in FIG. 12, the explanation that the output of the coordinates from the coordinate conversion part 160 to the output switching unit 163 or the output of the coordinates from the output switching unit 163 is not performed in AV mute has been made, however, for example, the output control unit 101 may stop the output of the coordinates in the following cases.

while switching between image sources is performed
while the image displayed by the projector 11 is temporarily stopped
in the case where the pointing tool 12 moves to the outside of the area where the location detection unit 150 can detect the pointed location, i.e., in the case where it is impossible to detect the location of the pointing tool 12 or the coordinates of the detected pointed location of the pointing tool 12 diverge from the value set as the detectable range In this case, the coordinate output is not performed, however, the processing of detecting the pointed location of the pointing tool 12 by the location detection unit 150 and converting the coordinates by the coordinate conversion part 160 may be performed.

Figure 13A:
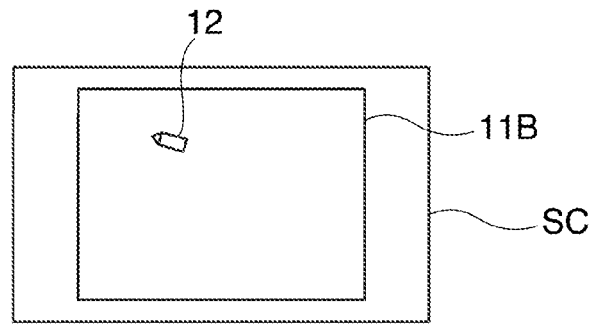
FIGS. 13A to 13D show examples of operations using a pointing tool on the screen.
Figure 13B:
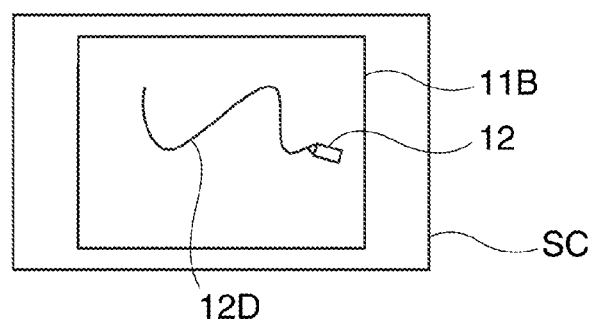
Figure 13C:
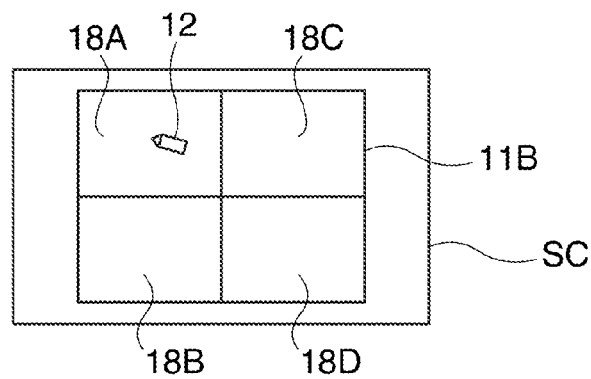
Figure 13D:
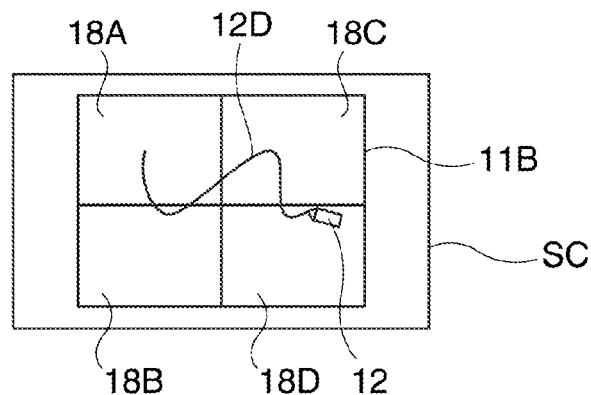

FIGS. 13A to 13D show examples of operations using the pointing tool 12 on the screen SC, FIG. 13A shows a state before operation in normal display, FIG. 13B shows an example of a trace of a pointed location, FIG. 13C shows a state before operation in multi-window display, and FIG. 13D shows an example of a trace of a pointed location in the multi-window display. FIGS. 13A to 15 show examples using the pen-shaped pointing tool 12.

When the pointing tool 12 is operated in the state shown in FIG. 13A and the state shown in FIG. 13B is obtained, the pointing tool 12 moves while drawing the trace 12D. The trace 12D is drawn and synthesized with the input image by the PC 13 in the PC interactive mode, and is drawn by the function of the image processing unit 110 in the PJ interactive mode.

In the explanation referring to FIGS. 13A to 15, the case where the pointing tool 12 is operated in the effective projection area 11B projected on the screen SC will be explained. Depending on the installation condition of the projector 11, projection may be performed on the entire of the projectable area 11A, i.e., the projectable area 11A may coincide with (be equal to) the effective projection area 11B, and the invention includes this case.

When the pointing tool 12 is operated in the execution of multi-window display and the state shown in FIG. 13C changes to the state shown in FIG. 13D, the trace 12D of the pointing tool 12 runs over the plural areas 18A, 18B, 18C, 18D provided in the effective projection area 11B. In this case, the input images of the different image sources are displayed in the respective areas 18A, 18B, 18C, 18D, and thus, one PC 13 can not draw the trace 12D. In that case, the coordinates converted by the coordinate conversion part 160 are output to the image processing unit 110 in the PJ interactive mode, and the image processing part 113 of the image processing unit 110 draws the trace of the pointing tool 12 based on the input coordinates at each time when the coordinates of the pointed location of the pointing tool 12 detected by the location detection unit 150 are input from the output switching unit 163. Thereby, the image processing unit 110 may collectively draw the trace 12D over the plural areas of the areas 18A, 18B, 18C, 18D, and the trace 12D over the input images of the plural image sources may be displayed on the screen SC.

Further, in the case where the projector 11 draws the trace 12D according to the pointed location of the pointing tool 12 during execution of the multi-window display shown in FIG. 13C in the PC interactive mode, when the pointed location of the pointing tool 12 is one of the areas 18A, 18B, 18C, 18D, processing of drawing the trace 12D may be performed by the PC 13, when the pointed location of the pointing tool 12 comes out to the other area, the operation mode may be automatically switched to the PJ interactive mode and the trace 12D over the plural areas may be drawn by the function of the image processing part 113. In this case, when the operation mode is automatically switched to the PJ interactive mode, the location of the trace 12D that has been already drawn or the coordinates based on which the trace 12D has been drawn may be input to the image processing unit 110.

Figure 14A:
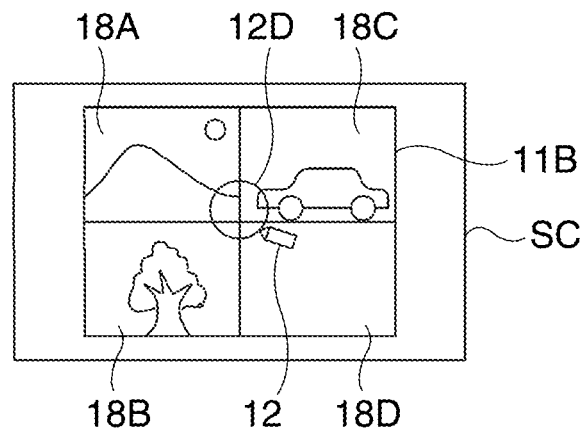
FIGS. 14A and 14B are explanatory diagrams showing an example of executing a zoom function in response to an operation over plural areas.
Figure 14B:
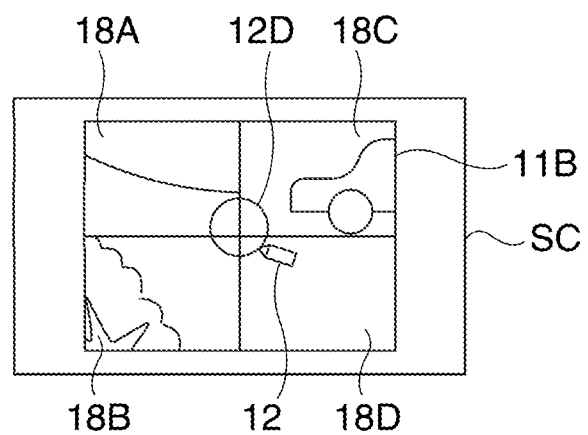

FIGS. 14A and 14B are explanatory diagrams showing an example of executing a zoom function in response to an operation over plural areas, and FIG. 14A shows a state in which a center of zoom is pointed and FIG. 14B shows a state in which zoom processing has been performed according to the pointed center.

In FIG. 14A, the input images from the different image sources are displayed in the respective areas 18A, 18B, 18C, 18D provided in the effective projection area 11B, and a circle over all areas 18A, 18B, 18C, 18D is pointed as the center of zoom by the pen-shaped pointing tool 12. When the function of pointing the center of zoom is executed, the control unit 103 acquires the trace of the pointed location of the pointing tool 12 with time and determines the center of zoom at the time when the trace 12D takes a fixed shape.

The control unit 103 allows the image processing part 113 to execute processing of respectively enlarging the input images of the respective image sources around the circle determined by the trace 12D. The image processing part 113 enlarges the frames of the respective input images according to the pointed center, cuts out the ranges displayed in the respective areas 18A, 18B, 18C, 18D from the enlarged respective frames, and produces one frame corresponding to the effective projection area 11B. Thereby, the image shown in FIG. 14B is displayed in the effective projection area 11B.

FIG. 14B shows the input image in enlarged display with a predetermined enlargement factor around the circle of the trace 12D and displayed in the respective areas. The processing of enlargement display can be executed by the projector 11 without outputting the coordinates to the image sources, and may be executed regardless of the types of the image sources. Further, reduced display of the input images being displayed in the respective areas 18A, 18B, 18C, 18D can be performed by the same processing.

Furthermore, processing of enlarging and reducing not only the input images of the respective image sources but also the trace drawn in response to the previous operation may be performed around the circle determined by the trace 12D. In this case, the trace drawn over the plural areas may be enlarged or reduced and displayed. The image processing unit 110 draws the trace in the PJ interactive mode, and the image processing unit 110 may also easily execute the processing of enlarging and reducing and displaying the trace.

In addition, the image processing unit 110 can enlarge or reduce the input image being displayed in one of the areas 18A, 18B, 18C, 18D, and enlarge or reduce and display the input image being displayed in the other area separately from the enlargement or reduction. That is, the input images being displayed in the respective areas 18A, 18B, 18C, 18D may be individually enlarged or reduced and displayed.

Figure 15:
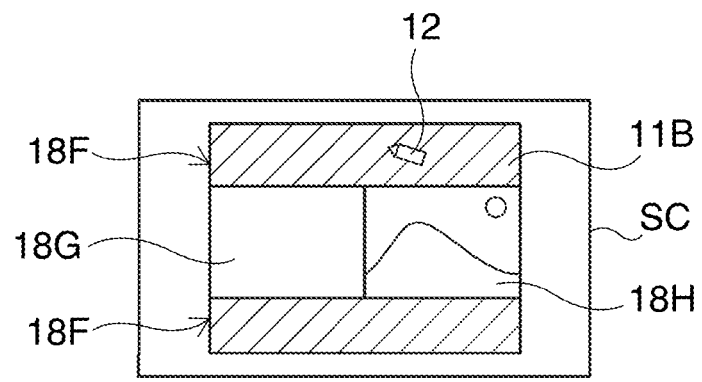
FIG. 15 is an explanatory diagram showing an example of location detection by a location detection unit.

FIG. 15 is an explanatory diagram showing an example of location detection by the location detection unit.

In the case of multi-window display, the respective areas (areas 18G, 18H in FIG. 15) can not occupy the whole effective projection area 11B, and black non-display areas 18F may be produced around the areas 18G, 18H where the input images are displayed.

In this case, as has been explained with reference to FIG. 7B, when the non-display area 18F is produced and the pointed location of the pointing tool 12 overlaps with the non-display area 18F, the coordinate conversion part 160 may not output the coordinates of the pointed location or output the coordinates of the location nearest the pointed location within the areas 18G, 18F where the images are displayed.

Further, not limited to the example shown in FIG. 15, but the output destination to which the output switching unit 163 outputs the coordinates can be constantly set to the image processing unit 110 in the execution of multi-window display. In this case, when the multi-window display function is started from the normal display state of displaying one input image input from one image source in the effective projection area 11B, the output control unit 101 switches the output destination of the output switching unit 163 to the image processing unit 110, and the reverse control is performed at the end of the multi-window display function. In this case, when the input images input from the plural image sources are displayed at the same time in the effective projection area 11B, the projector 11 executes the function of displaying the pointer 12A and the menu bar 12B or the function of drawing the trace 12D according to the pointed location in the effective projection area 11B, and thus, there are advantages that the processing of determining the image sources of the respective input images or the like may be omitted, the processing load may be reduced, and drawing of the trace 12D or the like may be promptly performed.

As described above, in the display system 10 according to the embodiment to which the invention is applied, the projector 11 provides the plural areas 18A, 18B, 18C, 18D on the screen SC, includes the projection unit 3 that respectively displays the input images input from the plural image sources in the respective areas, the location detection unit 150 that detects the pointed location on the screen SC, and the image processing unit 110 as a processing unit that executes processing over the plural areas according to the pointed location detected by the location detection unit 150, and may execute the processing over the plural areas and may process the input images from the plural image sources in response to the location pointing operation for the screen SC. As the image source in this case, when the image data stored not only in the plural PCs 13 but also in the memory unit 105 by the projector 11 itself is reproduced and displayed or when the image data stored in the memory device connected to the projector 11 is reproduced, the projector 11 itself may be used as one image source.

Further, the image processing unit 110 draws the image over the plural areas (trace 12D) as exemplified in FIGS. 13C and 13D according to the pointed location detected by the location detection unit 150, and allows the projection unit 3 to superimpose and display the drawn image on the input image, and thereby, may draw, superimpose, and display the image over the plural images input from the plural image sources in response to the location pointing operation for the screen SC.

Furthermore, the image processing unit 110 may execute processing of enlarged display or reduced display of the images being displayed in the plural areas within the respective areas as exemplified in FIGS. 14A and 14B according to the pointed location detected by the location detection unit 150, and may collectively enlarge or reduce and display the plural images input from the plural image sources.

In this case, the output control unit 101 determines the area to which the pointed location detected by the location detection unit 150 belongs and controls the output of the coordinates generated by the coordinate conversion part 160 to the PCs 13 and the image processing unit 110 in response to the types of image sources of the input images being displayed in the area to which the pointed location belongs, and thereby, may output the coordinates of the pointed location of the pointing tool 12 to the image processing unit 110 and draw the trace 12D during the multi-window display, for example. As described above, the output of the coordinates may be controlled in response to the image source of the input image overlapping with the pointed location, and the coordinates may be output appropriately in response to the operation of pointing the location.

Further, the output control unit 101 stops the output of the coordinates of the pointed location or changes the output destination to which the coordinates of the pointed location are output when the pointed location detected by the location detection unit 150 is not contained in the area in which a specific input image of the plural input images displayed on the screen SC is displayed or when the pointed location is outside of the display area of the input images. Accordingly, when the detected pointed location is not contained in the area in which a specific input image such as an input image from a preset image source, an input image displayed in a set location, or an input image that satisfies some condition is displayed, the output of the coordinates is stopped or the output destination of the coordinates is changed. Thereby, control may be performed so that the image supply device as the image source may not perform unintended operation according to unrelated coordinates not contained in the areas in which images to be processed are displayed. Thereby, the operation over the input images from the plural image sources may be appropriately supported and disturbance of the images or the like by the unintegrated operation by the plural image supply devices may be prevented.

Furthermore, the output control unit 101 may stop the processing according to the pointed location during display stop by stopping the output of the coordinates generated by the coordinate conversion part 160 while the projection by the projection part 30 is stopped by the mute function of the control unit 103, and thus, the situation that an unintended image is displayed when the display is restarted or the like may be prevented.

In addition, the projector 11 in the PJ interactive mode and the PCs 13 in the PC interactive mode execute GUI processing of drawing processing of drawing the trace 12D as an additional image on the image displayed on the screen SC, processing of moving the pointer 12A displayed on the screen SC, and the function set for the button corresponding to the pointed location in the menu bar 12B displayed on the screen SC according to the coordinates of the pointed location or the like, and thereby, may realize an operation environment with high operability using the pointing tool 12. Further, the output of the coordinates is appropriately controlled in response to the functions of the projector 11 and the PCs 13, and thereby, disruption of the drawing, display of the pointer, display when the GUI operation is executed or the like may be avoided.

Note that the above described embodiment is just an example of the specific embodiment to which the invention is applied, but does not limit the invention, and the invention may be applied as an embodiment different from the above described embodiment. For example, in the embodiment, the configuration in which the converted coordinates converted by the coordinate conversion part 160 with respect to the image processing unit 110 of the projector 11 are output to the output destination selected by the output switching unit 163 and the PC 13 or the image processing unit 110 draws the pointer 12A, the menu bar 12B, etc. has been explained as an example, however, the invention is not limited to that. A configuration in which an image processing unit 120 that generates images to be drawn and superimposed on the image data such as the pointer 12A, the menu bar 12B, etc. may be provided within the projector 11, and the output switching unit 163 can output the coordinates to the image processing unit 120 may be employed. The image processing unit 120 may perform different image processing from that of the image processing unit 110, or may perform completely or partially the same image processing as that of the image processing unit 110.

Figure 16:
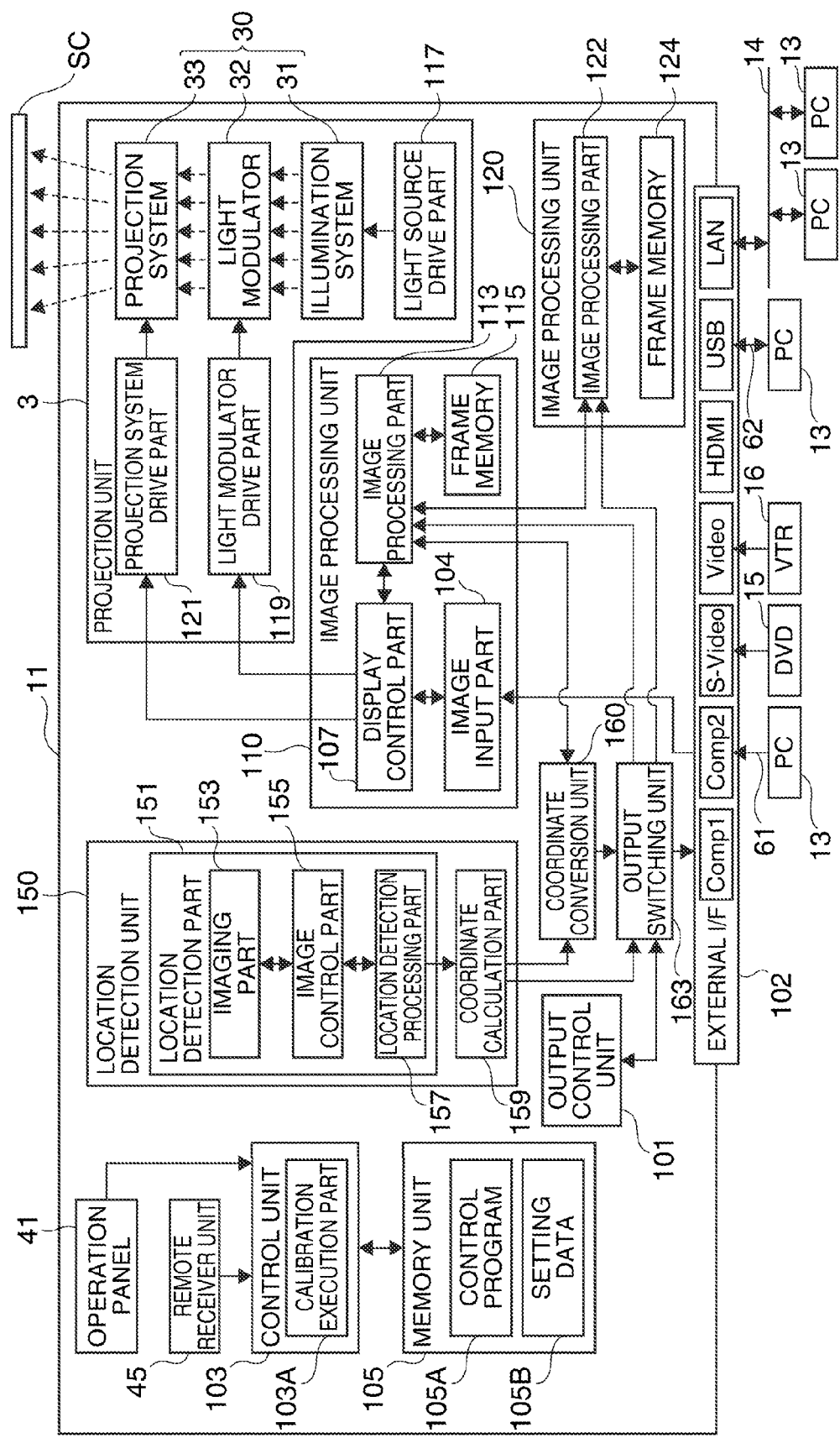
FIG. 16 is a block diagram showing a functional configuration of a projector as a modified example.

A projector 51 shown in FIG. 16 has the same respective functional parts as those of the projector 11 in the embodiment, and includes the image processing unit 120 that draws the pointer 12A, the menu bar 12B, etc. in response to the pointed location of the pointing tool 12. The image processing unit 120 includes an image processing part 122 that generates an image superimposed on image data according to the coordinates input from the coordinate conversion part 160, and a frame memory 124 that develops data when the image processing part 122 generates the image.

When the coordinate conversion part 160 outputs the converted coordinate data to the image processing unit 120, the image processing unit 120 draws images of the pointer 12A and the menu bar 12B using the image processing part 122, generates an image with the same resolution as that of the image developed by the display control part 107, and outputs the image to the image processing part 113. Here, the image output by the image processing part 122 includes the image of the pointer 12A, the menu bar 12B, or the like. The image processing part 113 combines the image input from the image processing part 122 with the image developed in the frame memory 115. Thereby, the image processing unit 120 may promptly display the pointer 12A or the menu bar 12B superimposed on the input image.

In the configuration, for example, when the image processing unit is set as the output destination of the coordinates by the setting of the setting data 105B (FIG. 10), the coordinates may be set to be output to both the image processing unit 110 and the image processing unit 120. Further, the coordinates may be output from the coordinate conversion part 160 to the image processing unit 110, and the setting data 105B may be set so that the coordinates may be output from the image processing unit 110 to the image processing unit 120. Alternatively, when only the image processing unit 120 performs drawing of the pointer 12A, the menu bar 12B, the drawn FIG. 12C, and the trace 12D according to the pointed location of the pointing tool 12, the setting data 105B may be set so that the coordinates may be output from the coordinate conversion part 160 only to the image processing unit 120. Furthermore, when the output destination set in the setting data 105B is "image processing unit", the output control unit 101 may perform processing of outputting the coordinates only to the image processing unit 120. In addition, in the execution of the multi-window display function, the output destination of the coordinates of the output switching unit 163 can be set to both of the image processing units 110, 120 or the image processing unit 120.

Further, in the configurations of the embodiments, the example in which the coordinate conversion part 160 does not output the converted coordinates when the coordinates of the pointed location calculated by the coordinate calculation part 159 are out of the area in which the image data is displayed has been explained as an example, the invention is not limited to that. For example, when the projector 11 discriminates the type of the externally input signal, when the projector 11 temporarily stops the projected image, when the projector 11 interrupts image projection, or the like, the coordinate conversion part 160 may not output the converted coordinates. Note that the projector 11 may interrupt image projection under the control of the control unit 103 when the projection system 33 is shielded by a movable shielding part (not shown) such as a shutter provided in front of the projector 11, when a command for interrupting image projection via the operation part such as the operation panel 41 or the remote is received, or the like.

Furthermore, in the configurations of the embodiments, the imaging part 153 and the image control part 155 of the location detection unit 150 may be replaced by a digital camera externally connected to the projector 11. The digital camera in this case may execute imaging under the control of the control unit 130 and output taken image data to the location detection processing part 157. A general-purpose interface such as a USB may be used as the interface connecting the digital camera and the projector 11, and the configurations of the embodiments may be easily realized.

In addition, in the embodiments, the configuration in which the PC 13 and the projector 11 are wired-connected by a cable or the like has been explained as an example, however, the connection form between the projector 11 and the PC 13 is arbitrary. For example, the projector 11 and the PC 13 may be connected to each other via near field communication such as a wireless LAN, and may transmit and receive image data and coordinate data via a wireless communication line.

Further, in the configurations of the embodiments, the pointing tool 12 is not limited to one having the rod shape or the pen shape, but, for example, a finger of the user may be used as the pointing tool 12 and its pointed location may be detected. Any of the finger of the user and a device other than the finger of the user may be detected as the pointing tool 12.

Furthermore, in the configurations of the embodiments, the configuration in which the location detection unit 150 detects the pointed location by the pointing tool 12 based on the taken image data has been explained as an example, however, the invention is not limited to that. For example, a pressure-sensitive or capacitance touch panel may be provided on the screen SC as the display surface or a display screen in other display systems, and the touch panel may detect contact of the user's finger, a rod-like member, or the like as the pointing tool 12.

In addition, in the embodiments, the configuration in which the light modulator 32 uses the three transmissive or reflective liquid crystal panels corresponding to the respective colors of RGB as means for modulating the light generated by the light source has been explained, however, the invention is not limited to that. For example, a system combining one liquid crystal panel and a color wheel, a system using three digital mirror devices (DMDs), a DMD system combining one digital mirror device and a color wheel, or the like may be employed. Here, in the case where only one liquid crystal panel or DMD is used as the display unit, the member corresponding to the combining system such as the cross dichroic prism is unnecessary. Other devices than the liquid crystal panel or the DMD may be employed without difficulty as long as they may modulate the light generated by the light source.

Further, the display device of the invention is not limited to the projector that projects images on the screen SC. The image display device of the invention includes various display devices such as self-emitting display devices of a liquid crystal monitor or a liquid crystal television that displays images on a liquid crystal panel, a monitor device or a television receiver that displays images on a PDP (plasma display panel), or a monitor device or a television receiver that displays images on an organic EL panel called OLED (Organic Light-emitting diode), OEL (Organic Electro-Luminescence), or the like. In this case, the liquid crystal display panel, the plasma display panel, the organic EL display panel correspond to a display unit, and its display screen corresponds to the display surface. More specifically, the entire area in which images can be displayed corresponds to the projectable area 11A, and the case where a window is constantly displayed in the entire projectable area 11A corresponds to the case where the projectable area 11A and the effective projection area 11B are equal.

Furthermore, the respective functional parts of the projectors 11, 51 shown in FIGS. 2 and 16 and the respective functional parts of the PC 13 shown in FIG. 3 show functional configurations realized by cooperation of hardware and software, and the specific mounting form is not particularly limited. Therefore, it may be not necessary that hardware individually dealing with the respective functional parts is mounted, and obviously, one processor may execute programs and realize the functions of the plural functional parts. Or, part of the functions realized by software in the embodiments may be realized by hardware or part of the functions realized by hardware in the embodiments may be realized by software. In addition, specific detailed configurations of the other respective parts of the display system 10 including the projector 11 and the PC 13 may be arbitrarily changed without departing from the scope of the invention.

In addition, the control program 105A that has been stored in the memory unit 105 in the embodiments may be downloaded from another device connected to the projector 11 via a communication network, or the control program 105A may be recorded in a portable recording medium and the respective programs may be read out from the recording medium and executed. Similarly, regarding the display control program 13A stored in the PC 13, the PC 13 may download the display control program 13A from another device and execute it or the PC 13 may read out the display control program 13A recorded in a portable recording medium and execute it.

Further, switching between the PJ interactive mode and the PC interactive mode may be executed when the operation of the operation panel 41, the remote, or the like is carried out. Or, a button for switching between the PJ interactive mode and the PC interactive mode is provided to the menu bar 12B and the user operates the button using the pointing tool 12, and, when the projector 11 detects the operation, the operation modes may be switched at the opportunity. Furthermore, when the projector 11 and the PC 13 are connected by a specific cable (for example, a USB cable) or when connection by a predetermined communication system (for example, USB communication) is established between the projector 11 and the PC 13, switching from the PJ interactive mode to the PC interactive mode may be performed. This is because the PC interactive mode may be used under the situation. Further, in these cases, the output destination of coordinate information may be switched with the switching between the operation modes from the PJ interactive mode to the PC interactive mode or vice versa.

Furthermore, in the embodiments, the configurations in which one pointing tool 12 is used has been explained as an example, however, the number of pointing tools is not limited in the invention. That is, the invention may use two or more pointing tools at the same time. In this regard, plural pointing tools 12 may be detected by one location detection unit 150, or all pointing tools 12 may be detected by location detection units 150 in the same number as the number of pointing tools or in the larger number than the number of pointing tools, the location detection unit 150 that can detect the user's finger as the pointing tool 12, or the location detection unit 150 that can detect another device than the user's finger as the pointing tool 12 may be provided. Not all of the location detection units 150 may be provided in the projector 11. For example, the projector 11 may include one location detection unit 150 and at least one location detection unit 150 may be provided outside of the projector 11.

In addition, in the embodiments, the configurations in which the location detection unit 150 detects the coordinates pointed by the pointing tool 12 have been explained, however, the information detected by the location detection unit 150 is not limited to the coordinates pointed by the pointing tool 12. The location detection unit 150 may detect other information which pointing devices (mouse, digitizer, and so on) can detect, and output the information touch information indicating whether or not the pointing tool 12 is in contact with the projection surface in addition to the coordinates pointed by the pointing tool 12. The projector may output the touch information with the coordinate information to the PC 13. For example, same as devices included in USB HID (human interface device) class (mouse, digitizer, and so on), the location detection unit 150 may output the coordinate information and the other information (for instance, information which indicates whether the operation portion of the devices is operated or not). The projector 11 may output the coordinate information and the other touch information to the PC 13 via USB communication, a LAN, or the like, and the output method may be wired communication or wireless communication.

Further, in the embodiments, the configurations in which the projector 11 includes the location detection unit 150 have been explained as an example, however, all or part of the configuration corresponding to the location detection unit 150 may be realized by another device than the projector 11. For example, the projector according to the invention may be adapted to connect to a digital camera having functions corresponding to the imaging part 153 and the image control part 155 and may acquire taken image data from the digital camera. Furthermore, the location detection unit 150 may be another device than the projector 11 or the PC 13. In this case, the location detection unit 150 may be a device independent from the projector 11. In addition, the location detection unit 150 may further has a function corresponding to the coordinate conversion part 160.

The entire disclosure of Japanese Patent Application No. 2011-240062, filed Nov. 1, 2011 is expressly incorporated by reference herein.

What is claimed is:

1. A display device comprising:
   a display unit that provides plural display areas on a shared display surface, each of the plural display areas respectively displaying an image input from a separate personal computer of a plurality of personal computers;
   a location detector that detects a pointed location on the shared display surface based on a captured image of the shared display surface; and
   a processing unit that executes processing over the plural display areas according to the pointed location detected by the location detector,
   wherein the processing over the plural display areas includes drawing a trace over the plural display areas, each of the plural display areas corresponding to a separate personal computer of the plurality of personal computers, according to movement of the pointed location, and superimposing and displaying the drawn trace over the plural display areas corresponding to the personal computers by the display unit, and
   wherein
   when a continuous movement of the pointed location is contained within one display area of the plural display areas displayed on the shared display surface, the processing of drawing and superimposing the trace over the one display area is carried out by the personal computer associated with the one display area, and
   when the continuous movement of the pointed location is detected to be located inside of multiple display areas of the plural display areas displayed on the shared display surface, the processing of drawing and superimposing the trace over the multiple display areas is switched to be carried out by the processing unit of the display device instead of the personal computers associated with the multiple display areas in which the continuous movement is detected.

2. The display device according to claim 1, wherein the processing unit executes processing of enlarged or reduced display of the images being displayed in the plural display areas within the respective display areas according to the pointed location detected by the location detector.

3. The display device according to claim 1, wherein the trace comprises a line.

4. The display device according to claim 1, wherein, when the location detector detects that the pointed location crosses a boundary on the shared display surface between the one display area and another display area, the processing of the drawing and superimposing the trace over the display area switches from being carried out by the personal computer to being carried out by the processing unit of the display device.

5. A method of controlling a display device that displays an input image input from an image source on a display surface, comprising:
   providing plural display areas on a shared display surface, each of the plural display areas respectively displaying an image input from a separate personal computer of a plurality of personal computers;
   imaging the shared display surface;
   detecting a pointed location on the shared display surface based on a captured image of the shared display surface captured during the imaging; and
   executing processing over the plural display areas according to the detected pointed location,
   wherein the processing over the plural display areas includes drawing a trace over the plural display areas, each of the plural display areas corresponding to a separate personal computer of the plurality of personal computers, according to movement of the pointed location, and superimposing and displaying the drawn trace over the plural display areas corresponding to the personal computers by the display unit, and
   wherein
      when a continuous movement of the pointed location is contained within one display area of the plural display areas displayed on the shared display surface, the processing of drawing and superimposing the trace over the one display area is carried out by the personal computer associated with the one display area, and
      when the continuous movement of the pointed location is detected to be located inside of multiple display areas of the plural display areas displayed on the shared display surface, the processing of drawing and superimposing the trace over the multiple display areas is switched to be carried out by the processing unit of the display device instead of the personal computers associated with the multiple display areas in which the continuous movement is detected.

6. A non-transitory computer-readable medium that stores a computer-executable program that controls a display device that displays an input image input from an image source on a display surface, allowing a computer to function as
   a display unit that provides plural display areas on a shared display surface, each of the plural display areas respectively displaying an image input from a separate personal computer of a plurality of personal computers;
   a location detector that detects a pointed location on the shared display surface based on a captured image of the shared display surface; and
   a processing unit that executes processing over the plural display areas according to the pointed location detected by the location detector,
   wherein the processing over the plural display areas includes drawing a trace over the plural display areas, each of the plural display areas corresponding to a separate personal computer of the plurality of personal computers, according to movement of the pointed location, and superimposing and displaying the drawn trace over the plural display areas corresponding to the personal computers by the display unit, and
   wherein
      when a continuous movement of the pointed location is contained within one display area of the plural display areas displayed on the shared display surface, the processing of drawing and superimposing the trace over the one display area is carried out by the personal computer associated with the one display area, and
      when the continuous movement of the pointed location is detected to be located inside of multiple display areas of the plural display areas displayed on the shared display surface, the processing of drawing and superimposing the trace over the multiple display areas is switched to be carried out by the processing unit of the display device instead of the personal computers associated with the multiple display areas in which the continuous movement is detected.

* * * * *